(12) United States Patent
Lafort et al.

(10) Patent No.: US 10,887,705 B2
(45) Date of Patent: Jan. 5, 2021

(54) ELECTRONIC CIRCUIT AND IN-EAR PIECE FOR A HEARING DEVICE

(71) Applicant: Sonion Nederland B.V., Hoofddorp (NL)

(72) Inventors: Adrianus Maria Lafort, Hoofddorp (NL); Caspar Titus Bolsman, Hoofddorp (NL); René Maas, Hoofddorp (NL); Theodorus Geradus Maria Brouwer, Hoofddorp (NL); Yang Gao, Hoofddorp (NL)

(73) Assignee: SONION NEDERLAND B.V., Hoofddorp (NL)

( * ) Notice: Subject to any disclaimer, the term of this patent is extended or adjusted under 35 U.S.C. 154(b) by 0 days.

(21) Appl. No.: 16/267,848

(22) Filed: Feb. 5, 2019

(65) Prior Publication Data
US 2019/0246219 A1    Aug. 8, 2019

(30) Foreign Application Priority Data
Feb. 6, 2018    (EP) ..................... 18155316

(51) Int. Cl.
*H04R 25/00* (2006.01)
*H04R 1/10* (2006.01)
(Continued)

(52) U.S. Cl.
CPC ........ *H04R 25/505* (2013.01); *F16K 11/0716* (2013.01); *F16K 31/0613* (2013.01);
(Continued)

(58) Field of Classification Search
CPC .. H04R 25/60; H04R 25/65; H04R 2225/023; H04R 2225/025
(Continued)

(56) References Cited

U.S. PATENT DOCUMENTS 6,788,796 B1    9/2004   Miles
6,831,577 B1   12/2004   Furst
(Continued)

FOREIGN PATENT DOCUMENTS

EP    2545719 A1    1/2013
EP    2835987 A1    2/2015
(Continued)

OTHER PUBLICATIONS

Extended European Search Report in Application No. 18155316.5, dated Jul. 11, 2018 (4 pages).
(Continued)

*Primary Examiner* — Suhan Ni
(74) *Attorney, Agent, or Firm* — Nixon Peabody LLP

(57) ABSTRACT

A method for controlling a controllable acoustic valve of a hearing device. The valve includes a moveable valve element adapted to be positioned in one of at least two essentially stable states. The moveable valve element is configured to be maintained in each of the essentially stable states by a retention force. A neutral point with essentially cancelling retention forces exists between the least two essentially stable states. The method includes providing a first drive signal to the controllable acoustic valve to overcome a retention force of a first essentially stable state in order to initiate movement of the moveable valve element from the first essentially stable state to a second essentially stable state. The provided first drive signal is capable of bringing the moveable valve element from the first essentially stable state and beyond a neutral point between the first and second essentially stable states.

15 Claims, 19 Drawing Sheets

(51) Int. Cl.
*F16K 11/07* (2006.01)
*F16K 31/06* (2006.01)
*H01F 7/06* (2006.01)

(52) U.S. Cl.
CPC ........... *H01F 7/064* (2013.01); *H04R 1/1041* (2013.01); *H04R 2225/61* (2013.01)

(58) Field of Classification Search
USPC ........................................ 381/322, 324, 328
See application file for complete search history.

(56) References Cited

U.S. PATENT DOCUMENTS

| | | | |
|---|---|---|---|
| 6,853,290 | B2 | 2/2005 | Jorgensen |
| 6,859,542 | B2 | 2/2005 | Johannsen |
| 6,888,408 | B2 | 5/2005 | Furst |
| 6,914,992 | B1 | 7/2005 | van Halteren |
| 6,919,519 | B2 | 7/2005 | Ravnkilde |
| 6,930,259 | B1 | 8/2005 | Jorgensen |
| 6,943,308 | B2 | 9/2005 | Ravnkilde |
| 6,974,921 | B2 | 12/2005 | Jorgensen |
| 7,008,271 | B2 | 3/2006 | Jorgensen |
| 7,012,200 | B2 | 3/2006 | Moller |
| 7,062,058 | B2 | 6/2006 | Steeman |
| 7,062,063 | B2 | 6/2006 | Hansen |
| 7,072,482 | B2 | 7/2006 | Van Doorn |
| 7,088,839 | B2 | 8/2006 | Geschiere |
| 7,110,560 | B2 | 9/2006 | Stenberg |
| 7,136,496 | B2 | 11/2006 | van Halteren |
| 7,142,682 | B2 | 11/2006 | Mullenborn |
| 7,181,035 | B2 | 2/2007 | van Halteren |
| 7,190,803 | B2 | 3/2007 | van Halteren |
| 7,206,428 | B2 | 4/2007 | Geschiere |
| 7,221,767 | B2 | 5/2007 | Mullenborn |
| 7,221,769 | B1 | 5/2007 | Jorgensen |
| 7,227,968 | B2 | 6/2007 | van Halteren |
| 7,239,714 | B2 | 7/2007 | de Blok |
| 7,245,734 | B2 | 7/2007 | Niederdraenk |
| 7,254,248 | B2 | 8/2007 | Johannsen |
| 7,286,680 | B2 | 10/2007 | Steeman |
| 7,292,700 | B1 | 11/2007 | Engbert |
| 7,292,876 | B2 | 11/2007 | Bosh |
| 7,336,794 | B2 | 2/2008 | Furst |
| 7,376,240 | B2 | 5/2008 | Hansen |
| 7,403,630 | B2 | 7/2008 | Jorgensen |
| 7,415,121 | B2 | 8/2008 | Mögelin |
| 7,425,196 | B2 | 9/2008 | Jorgensen |
| 7,460,681 | B2 | 12/2008 | Geschiere |
| 7,466,835 | B2 | 12/2008 | Stenberg |
| 7,492,919 | B2 | 2/2009 | Engbert |
| 7,548,626 | B2 | 6/2009 | Stenberg |
| 7,657,048 | B2 | 2/2010 | van Halteren |
| 7,684,575 | B2 | 3/2010 | van Halteren |
| 7,706,561 | B2 | 4/2010 | Wilmink |
| 7,715,583 | B2 | 5/2010 | Van Halteren |
| 7,728,237 | B2 | 6/2010 | Pedersen |
| 7,809,151 | B2 | 10/2010 | Van Halteren |
| 7,822,218 | B2 | 10/2010 | Van Halteren |
| 7,899,203 | B2 | 3/2011 | Van Halteren |
| 7,912,240 | B2 | 3/2011 | Madaffari |
| 7,946,890 | B1 | 5/2011 | Bondo |
| 7,953,241 | B2 | 5/2011 | Jorgensen |
| 7,961,899 | B2 | 6/2011 | Van Halteren |
| 7,970,161 | B2 | 6/2011 | van Halteren |
| 8,098,854 | B2 | 1/2012 | van Halteren |
| 8,101,876 | B2 | 1/2012 | Andreasen |
| 8,103,039 | B2 | 1/2012 | van Halteren |
| 8,160,290 | B2 | 4/2012 | Jorgensen |
| 8,170,249 | B2 | 5/2012 | Halteren |
| 8,189,804 | B2 | 5/2012 | Hruza |
| 8,189,820 | B2 | 5/2012 | Wang |
| 8,223,996 | B2 | 7/2012 | Beekman |
| 8,233,652 | B2 | 7/2012 | Jorgensen |
| 8,259,963 | B2 | 9/2012 | Stenberg |
| 8,259,976 | B2 | 9/2012 | van Halteren |
| 8,259,977 | B2 | 9/2012 | Jorgensen |
| 8,280,082 | B2 | 10/2012 | van Halteren |
| 8,284,966 | B2 | 10/2012 | Wilk |
| 8,313,336 | B2 | 11/2012 | Bondo |
| 8,315,422 | B2 | 11/2012 | van Halteren |
| 8,331,595 | B2 | 12/2012 | van Halteren |
| 8,369,552 | B2 | 2/2013 | Engbert |
| 8,379,899 | B2 | 2/2013 | van Halteren |
| 8,509,468 | B2 | 8/2013 | van Halteren |
| 8,526,651 | B2 | 9/2013 | Lafort |
| 8,526,652 | B2 | 9/2013 | Ambrose |
| 2011/0182453 | A1 | 7/2011 | van Hal |
| 2011/0189880 | A1 | 8/2011 | Bondo |
| 2011/0299708 | A1 | 12/2011 | Bondo |
| 2011/0299712 | A1 | 12/2011 | Bondo |
| 2011/0311069 | A1 | 12/2011 | Ambrose |
| 2012/0014548 | A1 | 1/2012 | van Halteren |
| 2012/0027245 | A1 | 2/2012 | van Halteren |
| 2012/0140966 | A1 | 6/2012 | Mocking |
| 2012/0155683 | A1 | 6/2012 | van Halteren |
| 2012/0155694 | A1 | 6/2012 | Reeuwijk |
| 2012/0255805 | A1 | 10/2012 | van Halteren |
| 2013/0028451 | A1 | 1/2013 | de Roo |
| 2013/0136284 | A1 | 5/2013 | van Hal |
| 2013/0142370 | A1 | 6/2013 | Engbert |
| 2013/0163799 | A1 | 6/2013 | Van Halteren |
| 2013/0195295 | A1 | 8/2013 | van Halteren |
| 2014/0169603 | A1 | 6/2014 | Sacha et al. |

FOREIGN PATENT DOCUMENTS

| | | |
|---|---|---|
| WO | 2010034337 A1 | 4/2010 |
| WO | 2010115451 A1 | 10/2010 |
| WO | 2011110579 A1 | 9/2011 |
| WO | 2015101505 A1 | 7/2015 |

OTHER PUBLICATIONS

Extended European Search Report for Application No. EP 19153751.3, dated Oct. 15, 2019 (7 pages).

ELECTRONIC CIRCUIT AND IN-EAR PIECE FOR A HEARING DEVICE

CROSS-REFERENCE TO RELATED APPLICATIONS

This application claims the benefit of European Patent Application Serial No. 18155316.5, filed Feb. 6, 2018, which is incorporated herein by reference in its entirety.

FIELD OF THE INVENTION

The present invention relates to an electronic circuit and an in-ear piece for a hearing device. In particular, the present invention relates to an electronic circuit and a method for controlling a hearing device and an in-ear piece comprising a speaker and a controllable acoustic valve. The electronic circuit and the in-ear piece of the present invention are configured to be electrically connected to other devices of the hearing device via a maximum of three electrical wires.

BACKGROUND OF THE INVENTION

Hearing devices may be implemented in various ways, including implementations where a hearing instrument is positioned behind the ear, whereas an in-ear piece is at least partly positioned in the ear canal. The hearing instrument and the in-ear piece are electrically connected via a number of electrical wires.

The number of wires between a hearing instrument and an in-ear piece should be limited for various reasons, including:
- a limited number of wires can be hidden in a thin cable that can be made almost invisible for cosmetic reasons, and
- the functionality of the in-ear piece has so far been limited in that only a microphone or a speaker should be supported If one or more additional components are added to an in-ear piece the number of wires between the associated hearing instrument and the in-ear piece will increase. This is disadvantageous in that it may result in a need for a new connector between the hearing instrument and the in-ear piece. Such a new connector will typically result in backwards compatibility problems between the hearing instrument and new in-ear pieces.

Moreover, a processor of a hearing instrument may not necessarily have additional ports to control or monitor such one or more additional components of an in-ear piece. Even further, the available port(s) on the processor of the hearing instrument, which are normally dedicated to drive a speaker of the in-ear piece, is/are not necessarily compatible with the interface to such one or more additional components.

Obviously, hearing device manufactures tend to avoid the above situation as it is highly disadvantageous.

Thus, there seems to be a need for a solution that facilitates that one or more additional components, such as controllable acoustic valves, sensors etc., can be added to the in-ear piece of a hearing device without increasing the number of wires between the hearing instrument and the in-ear piece.

It may therefore be seen as an object of embodiments of the present invention to provide an arrangement that facilitates that one or more additional components can be fully operated in the in-ear piece of a hearing without increasing the number of wires between the hearing instrument and the in-ear piece.

SUMMARY OF INVENTION

The above-mentioned object is complied with by providing, in a first aspect, a method for controlling a controllable acoustic valve of a hearing device, the controllable acoustic valve comprising
 a moveable valve element adapted to be positioned in one of at least two essentially stable states, wherein the moveable valve element is configured to be maintained in each of the essentially stable states by a retention force, and wherein a neutral point with essentially cancelling retention forces exists between the least two essentially stable states,
 the method comprising the step of
 providing a first drive signal to the controllable acoustic valve in order to overcome a retention force of a first essentially stable state in order to initiate movement of the moveable valve element from the first essentially stable state to a second essentially stable state, wherein the provided first drive signal is capable of bringing the moveable valve element from the first essentially stable state and beyond a neutral point between the first and second essentially stable states.

In the present context the controllable acoustic valve may be a micro acoustic valve having dimensions that allows it to fit inside an in-ear piece of a hearing device. The controllable acoustic valve may comprise a moveable part in the form of a moveable valve element adapted to be positioned in one of typically two essentially stable states. At each stable state, which may be an open state or a closed state, the moveable valve element is configured to be maintained in position by a retention force, such as a magnetic force, a resilient force etc. A neutral point may exist between the two essentially stable states, such as approximately halfway between the two essentially stable states where the retention forces essentially cancel out.

The first drive signal may be a controllable electrical signal which may be applied to for example drive coils of the controllable acoustic valve.

In order to save energy the method may further comprise the steps of determining the retention force of the first essentially stable state, and adjusting the provided first drive signal so that the retention force of the first essentially stable state is exceeded by less than 25%, such as less than 20%, such as less than 15%, such as less than 10%, such as less than 5%.

In an alternative energy saving approach the method may further comprise the steps of determining a required energy for bringing the moveable valve element from the first essentially stable state and beyond the neutral point, and adjusting the energy of the provided first drive signal so that the moveable valve element is brought beyond the neutral point by an energy margin of less than 25%, such as less than 20%, such as less than 15%, such as less than 10%, such as less than 5%.

In one embodiment, the applied first drive signal may comprise a first signal part comprising a first amplitude, a first polarity and a first duration. The applied first drive signal may further comprise a second signal part comprising a second amplitude, a second polarity and a second duration. The first and second polarities may be opposite polarities, and the first duration may be different from the second duration. Moreover, the first polarity may be positive, and the second polarity may be negative. Even further, the first duration may be longer than the second duration.

It is advantageous that the first and second parts of the drive signal have opposite polarities in that a positive polarity may be adapted to overcome the retention force and bring the moveable valve element beyond the neutral point, whereas a negative polarity may slow down or decelerate the moveable valve element and may thus ensure a click free and noiseless landing of the moveable valve element.

In another embodiment, the applied first drive signal may comprise a sawtooth shaped pulse having a first part and a second part, and wherein the applied first drive signal, during the first part, comprises a positive polarity, and wherein the applied first drive signal, during the second part, comprises a negative polarity.

Again it is advantageous that the first and second parts of the drive signal have opposite polarities in that a positive polarity may be adapted to overcome the retention force and bring the moveable valve element beyond the neutral point, whereas a negative polarity may slow down or decelerate the moveable valve element and may thus ensure a click free and noiseless landing of the moveable valve element.

In yet another embodiment, the applied first drive signal may comprise a plurality of pulses each having a variable duration. One or more of the plurality of pulses may have a positive polarity, and one or more of the plurality of pulses may have a negative polarity. As it will be discussed in further details below a drive signal comprising a plurality of pulses is advantageous in that it may be used for calibration purposes.

The method according to the method aspect may further comprise the step of generating and receiving a state indication signal comprising information about which essentially stable state (open or closed) the moveable valve element is in after providing the first drive signal to the controllable acoustic valve. The method may further comprise the step of providing a second drive signal to the controllable acoustic valve in case the state indication signal reveals that the moveable valve element is in an undesired state. The second drive signal is thus provided in case the moveable valve element does not respond as intended to the first drive signal. The second drive signal may comprise more energy compared to the first drive signal.

In a second aspect, the present invention relates to a method for controlling a controllable acoustic valve of a hearing device, the controllable acoustic valve comprising
 a moveable valve element adapted to be positioned in one of at least two essentially stable states, wherein the moveable valve element is configured to be maintained in each of the essentially stable states by a retention force,
 the method comprising the step of
 providing a drive signal to the controllable acoustic valve, said drive signal comprising a first and a second part, wherein the drive signal, in the first part, is adapted to overcome a retention force of a first essentially stable state in order to initiate movement of the moveable valve element from the first essentially stable state to a second essentially stable state, and wherein the drive signal, in the second part, is adapted to decelerate the movement of the moveable valve element before it reaches the second essentially stable state in order to reduce generation of impact noise.

Thus, according to the second aspect the provided drive signal may comprise a first part adapted to overcome a retention force of a first essentially stable state, and a second part adapted to slow down or decelerate the moveable valve element before it reaches its destination in order to reduce generation of impact noise, such as click and contact noise.

The drive signal may, during the first part, have a first amplitude, and it may have, during the second part, have a second amplitude. The second amplitude may be smaller than the first amplitude. In fact the drive signal may, during the first part, have a positive polarity, and it may have, during the second part, have a negative polarity.

In a third aspect, the present invention relates to a method for controlling a controllable acoustic valve of a hearing device, the controllable acoustic valve comprising
 a moveable valve element adapted to be positioned in one of at least two essentially stable states, wherein the moveable valve element is configured to be maintained in each of the essentially stable states by a retention force,
 the method comprising the step of
 providing a first drive signal to the controllable acoustic valve in order to overcome a retention force of a first essentially stable state in order to initiate movement of the moveable valve element from the first essentially stable state to a second essentially stable state,
 generating and receiving a state indication signal comprising information about which essentially stable state the moveable valve element is in after providing the first drive signal to the controllable acoustic valve, and
 providing a second drive signal to the controllable acoustic valve in case the state indication signal reveals that the moveable valve element is in an undesired state.

In a fourth aspect the present invention relates to an electrical circuit for controlling a hearing device comprising a miniature speaker and a controllable non-speaker transducer, said electrical circuit being adapted to
 1) receive/provide a first drive signal for driving the miniature speaker, and
 2) receive/provide a second drive signal for driving the controllable non-speaker transducer, and/or send/receive one or more information/sensing signals from the controllable non-speaker transducer,
 wherein the received/provided first and second drive signals and the sent/received one or more information/sensing signals is/are provided to/from the electronic circuit via a maximum of three connection paths.

The hearing device to be controlled may comprise a hearing instrument adapted to be positioned being the ear of the used of the hearing device, and an in-ear piece adapted to be at least partly positioned in the ear canal of the user. In case the electrical circuit of the present invention is positioned in the ear-piece the electrical circuit may be adapted to receive the first drive signal for driving the miniature speaker, and receive the second drive signal driving the controllable non-speaker transducer and/or send the one or more information/sensing signals from the controllable non-speaker transducer. In case the electronic circuit is positioned in the hearing instrument the electrical circuit may be adapted to provide the first drive signal for driving the miniature speaker, and provide the second drive signal driving the controllable non-speaker transducer and/ or receive the one or more information/sensing signals from the controllable non-speaker transducer.

In a preferred embodiment the received/provided first and second drive signals and the sent/received one or more information/sensing signals is/are provided to/from the electronic circuit via a maximum of two connection paths, such as via a single twisted pair of wires.

The electronic circuit of the present invention is advantageous in that it, due to its communication interface accepting no more than three connection path, is fully compatible with existing hearing device components.

The electronic circuit may further comprise means for controlling an arrangement of controllable switches for connecting and/or disconnecting the miniature speaker to/from suitable drive signals, and connecting and/or disconnecting the controllable non-speaker transducer to/from suitable power supply lines.

Moreover, electronic circuit may further comprise a comparator for comparing a value of a received drive signal with a reference value, and control the operation of the miniature speaker and/or the controllable non-speaker transducer in response to this comparison. Alternatively or in combination therewith the electronic circuit may further comprise a detector for detecting an embedded signal in a received drive signal, and control the operation of the miniature speaker and/or the controllable non-speaker transducer in response to this embedded signal. Also, the electronic circuit may further comprise a voltage dependent conductor circuitry for controlling the operation of the miniature speaker and/or the controllable non-speaker transducer. The voltage dependent conductor circuitry may comprise a pair of anti-parallel zener diodes.

In a fifth aspect the present invention relates to a hearing device comprising a hearing instrument and an in-ear piece comprising a miniature speaker, a controllable non-speaker transducer and an electronic circuit according to the fourth aspect. The hearing device may further comprise a power harvesting module and a power storage unit, the power harvesting module being configured to generate a power supply signal on the basis of a received drive signal. The controllable non-speaker transducer may in principle be any type of non-sound generating transducer. Thus, the controllable non-speaker may comprise a transducer selected from the group consisting of: temperature sensors, humidity sensors, pressure and/or acoustical sensors, acoustic valves and inflatable balloon dome.

In a sixth aspect the present invention relates to a method for controlling a hearing device comprising a miniature speaker and a controllable non-speaker transducer, said method comprising the steps of 1) receiving/providing a first drive signal for driving the miniature speaker, and 2) receiving/providing a second drive signal for driving the controllable non-speaker transducer, and/or sending/receiving one or more information/sensing signals from the controllable non-speaker transducer, wherein the received/provided first and second drive signals and the sent/received one or more information/sensing signals is/are provided to/from an electronic circuit via a maximum of three connection paths.

Similar to the fourth aspect the electrical circuit may receive the first drive signal for driving the miniature speaker, and receive the second drive signal driving the controllable non-speaker transducer and/or send the one or more information/sensing signals from the controllable non-speaker transducer. Alternatively, the electrical circuit may provide the first drive signal for driving the miniature speaker, and provide the second drive signal driving the controllable non-speaker transducer and/or receive the one or more information/sensing signals from the controllable non-speaker transducer.

In a preferred embodiment the received/provided first and second drive signals and the sent/received one or more information/sensing signals is/are provided to/from the electronic circuit via a maximum of two connection paths, such as via a single twisted pair of wires.

The method may further comprise the step of generating a power supply signal on the basis of a received drive signal, and store said generated power supply signal in a power storage unit. Moreover, the method may further comprise the step of controlling an arrangement of controllable switches for connecting and/or disconnecting the miniature speaker to/from suitable drive signals, and connecting and/or disconnecting the controllable non-speaker transducer to/from suitable power supply lines.

In terms of controlling the miniature speaker and/or the controllable non-speaker transducer the method may further comprise the step of comparing a value of a received drive signal with a reference value, and control the operation of the miniature speaker and/or the controllable non-speaker transducer in response to this comparison. The value of the received drive signal may comprise an average value of the speaker drive signal.

Alternatively or in combination wherewith the method may further comprise the step of detecting an embedded signal in a received drive signal, and control the operation of the miniature speaker and/or the controllable non-speaker transducer in response to this embedded signal. Also, the method may further comprise the step of providing a voltage dependent conductor circuitry for controlling the operation of the miniature speaker and/or controllable non-speaker transducer, said voltage dependent conductor circuitry comprising a pair of anti-parallel zener diodes.

In a seventh aspect the present invention relates to an in-ear piece for a hearing device, said in-ear piece comprising 1) a speaker, 2) an acoustic valve, and 3) a communication interface for receiving one or more drive signals and/or sending one or more information signals via a maximum of three connection paths, wherein said one or more received drive signals is/are used to drive the speaker and/or to control the acoustic valve.

Thus, according to the seventh aspect of the present invention an in-ear piece of a hearing device comprising the communication interface, such as a terminal or a plug, accepting a maximum of three electrical connections, such as wires, is provided. In a preferred embodiment the communication interface accepts only two electrical connections, such as a single twisted pair of wire.

The in-ear piece of the present invention is advantageous in that it, due to its communication interface accepting no more than three connection path, is fully compatible with existing hearing device components, such as hearing instruments to be positioned behind the ear of a user.

The in-ear piece of the present invention may further comprise a control module for controlling operation of the speaker and/or the acoustic valve in response to one or more received drive signals.

Moreover, the in-ear piece may further comprise its own power supply. Thus, the in-ear piece may further comprise a power harvesting module and a power storage unit, the power harvesting module being configured to generate a power supply signal on the basis of a received drive signal. The received drive signal may be a PWM signal from an H-bridge of a DSP positioned in the hearing instrument of the hearing device.

The in-ear piece may further comprise an arrangement of controllable switches for connecting and/or disconnecting the speaker to/from suitable drive signals, and connecting and/or disconnecting the acoustic valve to/from suitable power supply lines.

The control module of the in-ear piece may comprise a comparator for comparing a value of a received drive signal with a reference value, and wherein the control module is configured to control the operation of the speaker and/or the acoustic valve in response to this comparison. The value of the received signal may be an average voltage value determined over a pre-set period of time.

Alternative or in combination therewith the control module of the in-ear piece may comprise a detector for detecting an embedded signal in a received drive signal, and wherein the control module is configured to control the operation of the speaker and/or the acoustic valve in response to this embedded signal. The embedded or encoded signal may be in the frequency domain, time domain and/or amplitude domain.

The in-ear piece may further comprise a voltage dependent conductor circuitry for controlling the operation of the speaker and/or the acoustic valve. The voltage dependent conductor circuitry may comprise a pair of anti-parallel zener diodes.

The one or more information signals may be used to gain information about a variety of parameters. As an example the one or more information signals may be used to gain information about the acoustic valve, such as in formation about a status of the acoustic valve. The status of the acoustic valve may involve whether the valve is open or closed.

The in-ear piece of the present invention may comprise additional sensors/actuators. Thus, the in-ear piece may further comprise one or more additional sensors, such as temperature, humidity, pressure and/or acoustical sensors. The case of one or more additional sensors the one or more information signals may be used to communicate information from such one or more sensors.

In an eight aspect the present invention relates to a hearing device comprising a hearing instrument and an in-ear piece according to the third aspect, wherein the one or more drive signals for driving the speaker and/or controlling the acoustic valve may comprise one or more PWM signals. The PWM signal may originate from an H-bridge of a DSP positioned in the hearing instrument of the hearing device.

In a ninth aspect the present invention relates to a method for controlling an in-ear piece for a hearing device, said in-ear piece comprising a speaker, an acoustic valve, and a communication interface for receiving one or more drive signals and/or sending one or more information signals via a maximum of three connection paths, the method comprising the step of using said one or more received drive signals to drive the speaker and/or to control the acoustic valve.

As addressed above the in-ear piece is advantageous in that it, due to its communication interface accepting no more than three connection path, is fully compatible with existing hearing device components, such as hearing instruments to be positioned behind the ear of a user. In a preferred embodiment the communication interface accepts only two electrical connections, such as a single twisted pair of wire.

The method may further comprise the step of providing one or more information signals, said one or more information signals providing information about the acoustic valve, such as a status of the acoustic valve. The status of the acoustic valve may involve whether the valve is open or closed.

As addressed above the in-ear piece of the present invention may comprise additional sensors/actuators, such as temperature, humidity, pressure and/or acoustical sensors. The case of one or more additional sensors the one or more information signals may be used to communicate information from such one or more sensors.

The method may further comprise the step of generating a power supply signal on the basis of a received drive signal, and store said generated power supply signal in a power storage unit. Thus, the in-ear may have its own power supply where power is derived from the received drive signal.

The method may further comprise the step of controlling an arrangement of controllable switches for connecting and/or disconnecting the speaker to/from suitable drive signals, and connecting and/or disconnecting the acoustic valve to/from suitable power supply lines.

As addressed above the method of the present invention uses the one or more received drive signals to drive the speaker and/or to control the acoustic valve. In this respect the method may comprise the step of comparing a value of a received drive signal with a reference value, and control the operation of the speaker and/or the acoustic valve in response to this comparison. The value of the received drive signal may comprise an average voltage value of the speaker drive signal. Alternative or in combination therewith the method may comprise the step of detecting an embedded signal in a received drive signal, and control the operation of the speaker and/or the acoustic valve in response to this embedded signal. The embedded or encoded signal may be in the frequency domain, time domain and/or amplitude domain. Alternatively or in combination therewith the method may comprise the step of providing a voltage dependent conductor circuitry for controlling the operation of the speaker and/or the acoustic valve. The voltage dependent conductor circuitry may comprise a pair of anti-parallel zener diodes.

The in-ear piece may comprise one or more additional sensors, such as temperature, humidity, pressure and/or acoustical sensors. In this case the method may comprise the step of providing one or more information signals in order to communicate information from the one or more sensors.

In a tenth aspect the present invention relates to an electrical circuit for controlling a miniature speaker and a controllable acoustic valve of an in-ear piece of a hearing device, said electrical circuit being adapted to 1) receive a first drive signal for driving the miniature speaker, and 2) receive a second drive signal for activating the controllable acoustic valve, wherein the received first and second drive signals are provided to the electronic circuit via a maximum of two electrical connection paths.

In general the various aspects of the present invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be described in further details with reference to the accompanying figures, wherein.

Figure 1A:
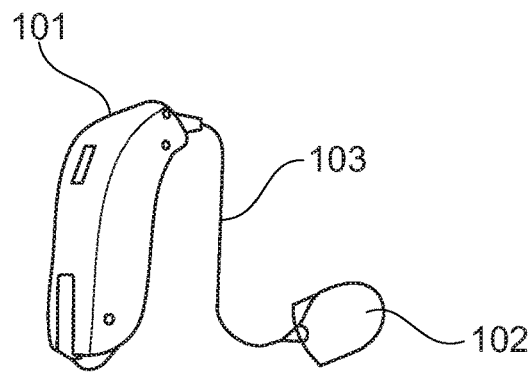
FIGS. 1a, 1b and 1c show a hearing device comprising a hearing instrument and an in-ear piece.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

Referring now to FIG. 1a a hearing device comprising a hearing instrument 101 and an in-ear piece 102 is depicted. The hearing instrument 101 is adapted to be positioned behind the ear of the user of the hearing device, whereas the in-ear piece 102 is adapted to be positioned at least partly in the ear canal of the user of the hearing device. The hearing instrument 101 and the in-ear piece 102 is electrically interconnected by a number of electrical wires 103 so that one or more electrical signals may be exchanged between the hearing instrument 101 and the in-ear piece 102. The number of wires interconnecting the hearing instrument 101 and the in-ear piece 102 does not exceed three electrical wires, thus including a single twisted pairs of wires.

Figure 1B:
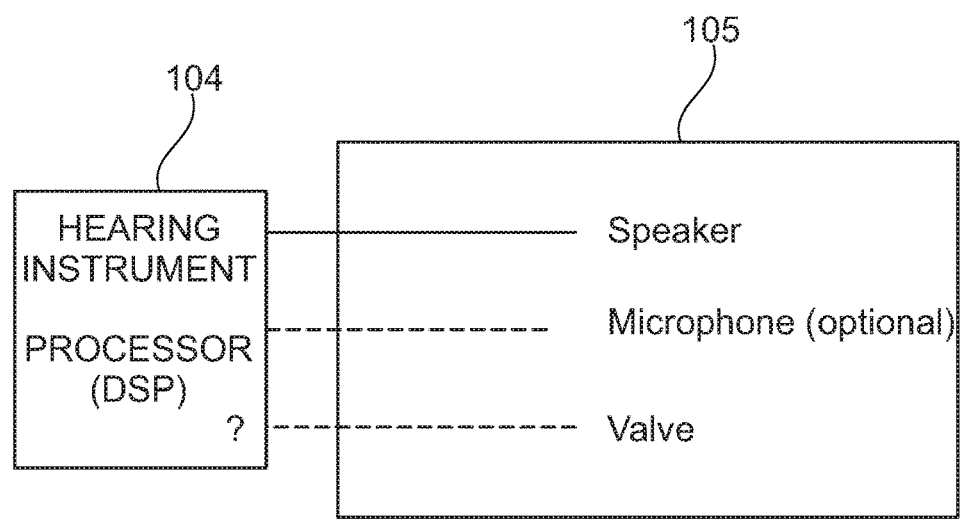
Figure 1C:
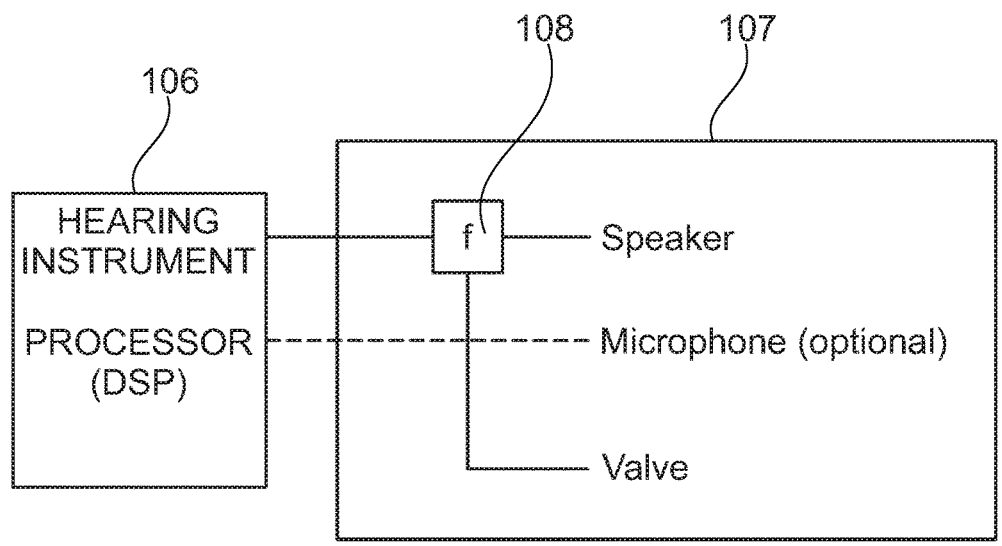

As shown in FIG. 1b the hearing instrument 104 comprises a digital signal processor (DSP). The in-ear piece 105 comprises a speaker, an acoustic valve and an optional microphone. A speaker, an acoustic valve and a microphone would traditionally each require multiple electrical wires between the hearing instrument 104 and the in-ear piece 105. However, as depicted in FIG. 1c an existing speaker wiring may be used to drive, i.e. open and/or close, the acoustic valve. This functionality is provided by the detector 108 which is able to distinguish between activation of the speaker and/or activation of the acoustic valve. The various implementations of the detector 108, which is connected to the hearing instrument 106, is discussed in further details below.

Figure 2:
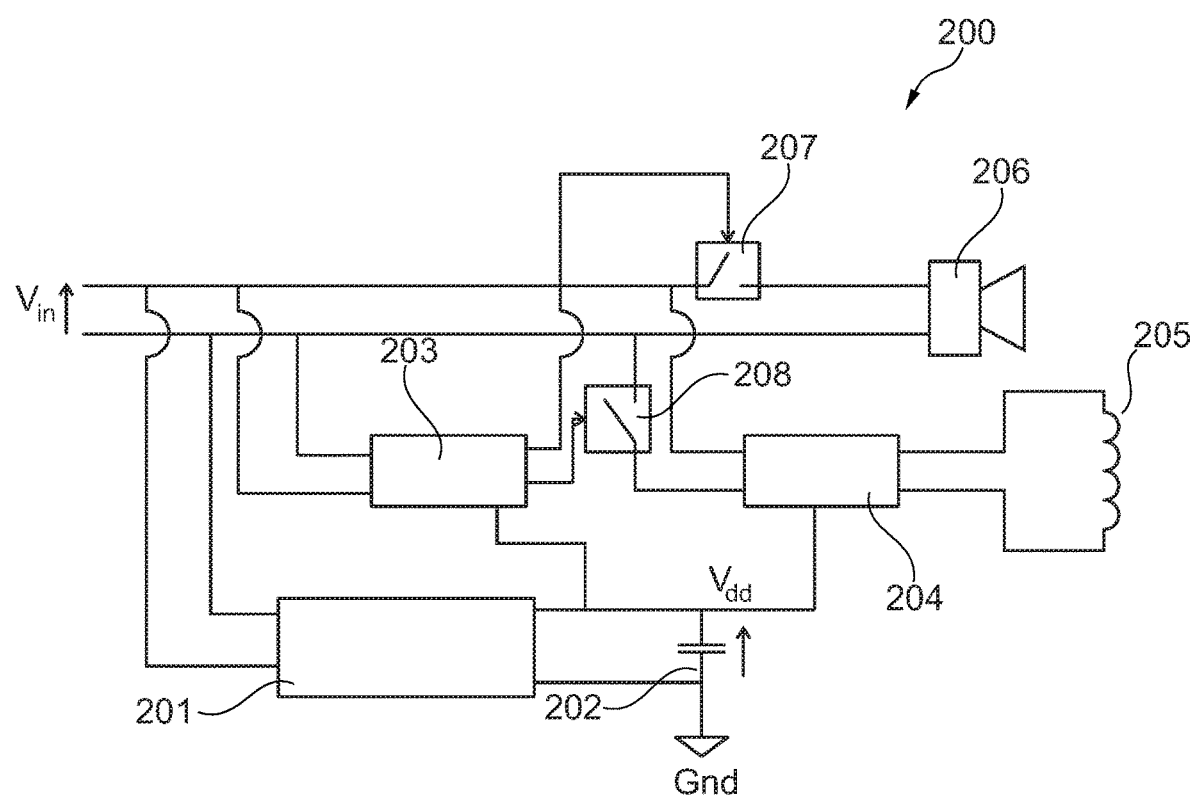
FIG. 2 shows a harvester based embodiment of the present invention.

FIG. 2 shows a high level block diagram of an electronic circuit 200 comprised within an in-ear piece. As seen in FIG. 2 the electronic circuit 200 comprises a power harvesting unit 201 for generating a supply voltage, Vdd, from the input signal, Vin, which is provided to the in-ear piece via two wires. The input signal, Vin, is a Pulse Width Modulated (PWM) signal that originates from an H-bridge of the Class-D DSP in an associated hearing instrument (not shown). The supply voltage, Vdd, is generated across the storage capacitor 202 by charging this storage capacitor 202 with a small current from the H-bridge.

The supply voltage, Vdd, is used for powering the driver unit 204 for the coil 205 of the acoustic valve, the switches 207, 208, and the detector unit 203 which determines whether the input signal, Vin, is intended for the speaker 206 or comprises a trigger signal for the coil 205 of the acoustic valve. In case the input signal, Vin, is intended for the speaker 206, i.e. is a drive signal for the speaker 206, the detector unit 203 facilitates that the switch 207 is closed, whereas switch 208 is open. In case the input signal, Vin, contains a trigger signal for the coil 205 of the acoustic valve, i.e. for opening or closing the acoustic valve, the detector unit 203 facilitates that the switch 207 is open, whereas switch 208 is closed.

Figure 3:
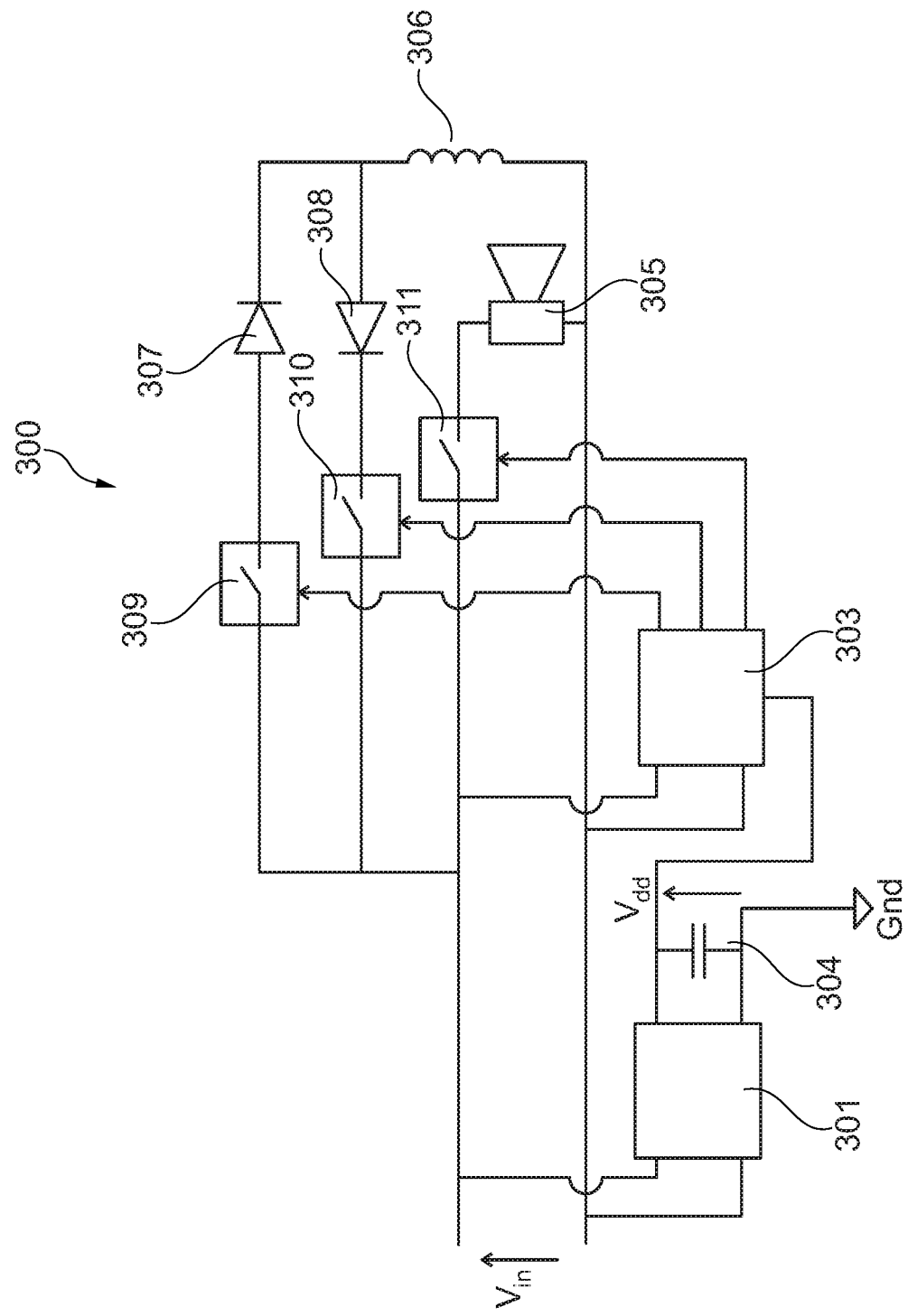
FIG. 3 shows another harvester based embodiment of the present invention.

FIG. 3 shows a more detailed block diagram of an electronic circuit 300 comprised within an in-ear piece. Similar to FIG. 2 the in-ear piece comprises a power harvesting unit 301 for generating a supply voltage, Vdd, from the input signal, Vin, which is provided to the in-ear piece via two wires. As it will be discussed in more details below the two wires support the following three functionalities: driving the speaker 305, controlling the switches 309-311, and powering the coil 306 of the acoustic valve.

The supply voltage, Vdd, generated across the storage capacitor 304 is used for powering the detector and control unit 303 and the switches 309-311. The detector and control unit 303 determines whether the input signal, Vin, is intended for the speaker 305 or comprises a trigger signal for the coil 306 of the acoustic valve. Thus, the detector and control unit 303 is adapted to detect a trigger signal in Vin from the H-bridge (not shown), and based on that, temporary changing the status of the switches 309-311 so that the coil 306 of the acoustic valve can be driven directly from the H-bridge.

In case the input signal, Vin, is intended for the speaker 305 the detector and control unit 303 facilitates that switch 311 is closed, whereas switches 309, 310 are open.

In case the input signal, Vin, contains a trigger signal for closing the acoustic valve switch 309 is closed thereby connecting the coil 306 of the acoustic valve to the H-bridge through the optional diode 307. Switches 310, 311 are open. Similarly, in case the input signal, Vin, contains a trigger signal for opening the acoustic valve switch 310 is closed thereby connecting the coil 306 of the acoustic valve to the H-bridge through the optional diode 308. Switches 309, 311 are open. The trigger signal in Vin may have different natures, such as a tone outside the normal frequency range of the speaker, an embedded or encoded signal in the frequency domain, time domain and/or amplitude domain.

In the embodiment shown in FIG. 3 the power for the coil 306 of the acoustic valve is not stored in the storage capacitor 304. Instead, the power for the coil 306 is taken directly from the H-bridge. The power from the H-bridge can be transmitted as a single tone burst of sufficient amplitude and duration to toggle the coil 306 of the acoustic valve. The single tone doesn't necessarily has to be outside the normal frequency range of the speaker as the speaker, as disclosed above, can be disconnected by opening switch 311 during the duration of the burst.

Figure 4:
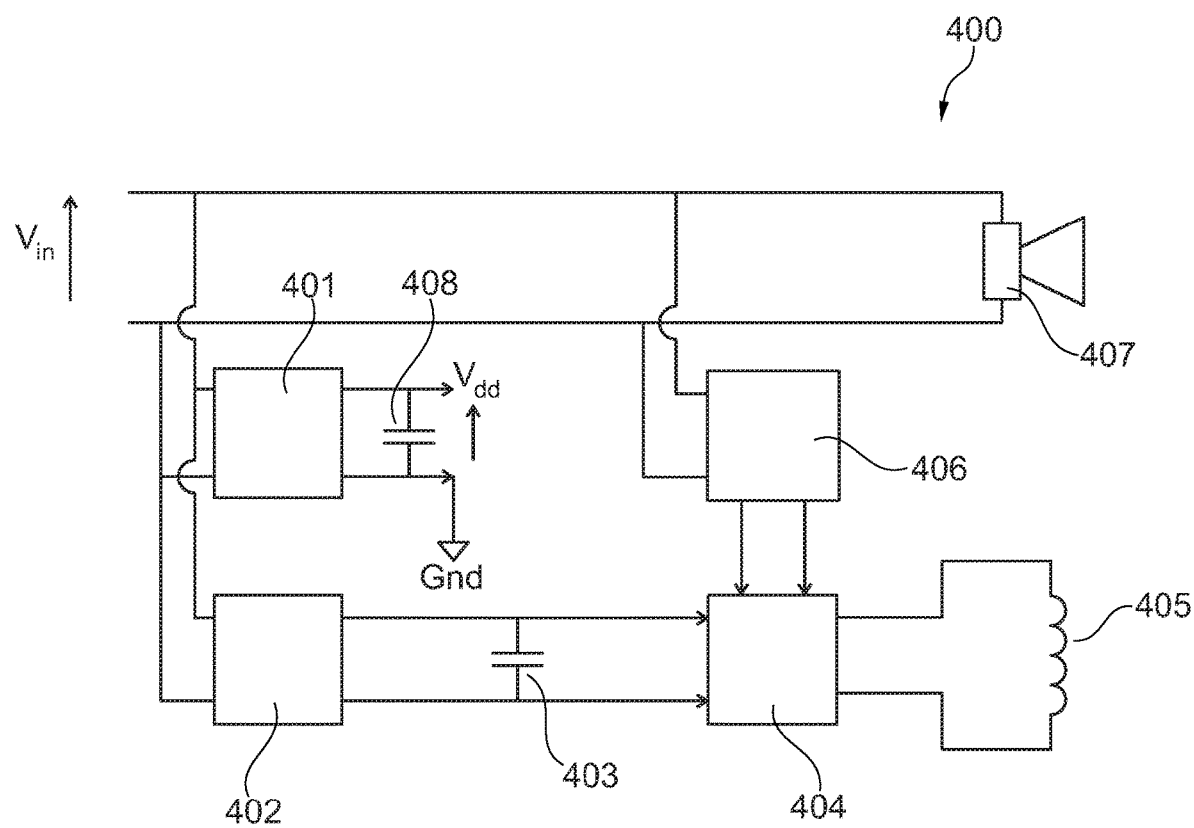
FIG. 4 shows a harvester and voltage doubler based embodiment of the present invention.

Referring now to FIG. 4 another block diagram of an electronic circuit 400 comprised within an in-ear piece is depicted. The embodiment shown in FIG. 4 also employs a two-wire input signal from the H-bridge for three functionalities—namely driving the speaker 407, controlling switching of the acoustic valve, and indirectly powering the coil 405 of the acoustic valve via a local power storage 403. As shown in FIG. 4 the electronic circuit 400 comprises a power harvesting unit 401 for harvesting a low current from the H-bridge signal and charging the storage capacitor 408. The harvesting unit 401 and the storage capacitor 408 provide an internal power supply for detector and controller unit 406.

The detector and controller unit 406 is adapted to detect a trigger signal from the H-bridge, and, based on that detection, control the driver unit 404 that provides power to the coil 405 of the acoustic valve. A voltage doubler unit 402 for harvesting a low current from the H-bridge signal charges a storage capacitor 403 through a chain of voltage doublers. The storage capacitor 403 is adapted to provide power to the driver unit 404 for the coil 405 of the acoustic valve. The driver unit 404 may comprise an H-bridge structure that is capable of feeding current from the storage capacitor 403 through the coil 405 in two directions in order to close or open the acoustic valve.

In the embodiment shown in FIG. 4, the power for the coil 405 of the acoustic valve is stored locally in the storage capacitor 403. The voltage doubler unit 402 is used in order to increase the energy density, so that a relative small storage capacitor 403 can be used. No power burst from the H-bridge is needed to drive the coil 405 of the acoustic valve. As a consequence the speaker 407 doesn't need to be decoupled, and may thus still be driven with an acoustic signal while also operating the acoustic valve.

As previously addressed the trigger signal in Vin may have different natures, such as a tone outside the normal frequency range of the speaker, an embedded or encoded signal in the frequency domain, time domain and/or amplitude domain.

Figure 5:
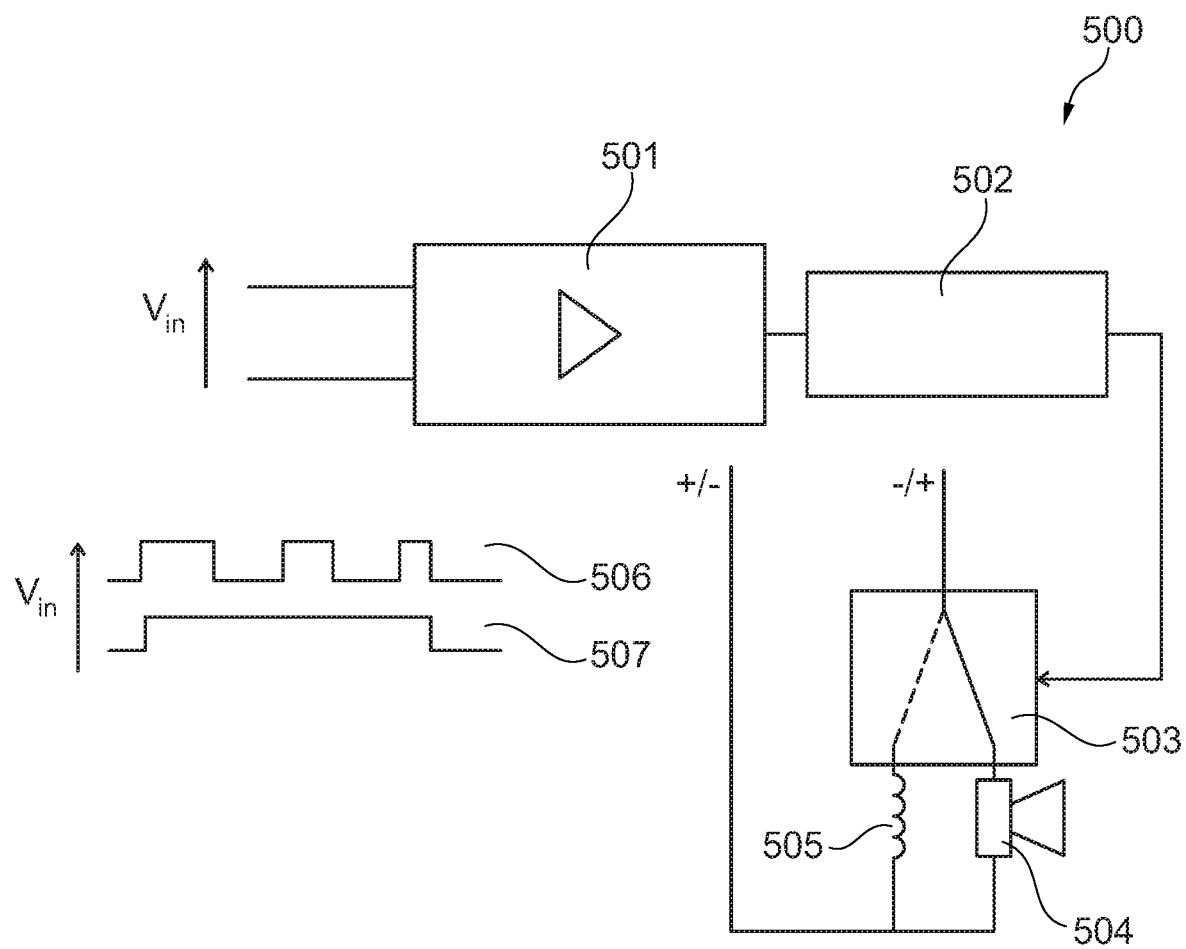
FIG. 5 shows an embodiment of the present invention using comparator.

In FIG. 5 yet another embodiment of the present invention is depicted. FIG. 5 shows a high level block diagram of an electronic circuit 500 comprised within an in-ear piece is depicted. The embodiment depicted in FIG. 5 receives its input signal, Vin, via two wires from the H-bridge, and provides the following functionalities: driving the speaker 504, controlling the switch 503, and directly or indirectly powering the coil 505 of the acoustic valve via a local power source (not shown). The local power source may be a power harvesting unit in combination with a storage capacitor.

The high level block diagram 500 comprises a comparator 501 for comparing an average voltage value of the PWM signal from the H-bridge with a predefined threshold voltage level. As long as the average voltage value is below the predefined threshold voltage level this is considered to be "normal operation", say for example voltage 506, and the switch 503 forwards the PWM signal directly to the speaker 504. However, if the average voltage value during a certain time period is higher than the predefined threshold voltage level, say for example voltage 507, the switch 503 is toggled from "normal operation" to "valve operation". The length of the certain time period is set by the integration timer unit 502.

As already addressed the switch 503 may lead the H-bridge PWM signal directly to the speaker 504, or it may connect a voltage with a reversible polarity to the coil 505 of the acoustic valve. This reversible voltage does not necessarily have to come from the H-bridge but can also be derived using a power harvesting unit in combination with a storage capacitor.

As already addressed the integration timer unit 502 determines the duration of a "valve operation" event detected by the comparator 501. If the event exceeds a certain time period the switch 503 is toggled from "normal operation" to "valve operation". In this mode of operation the acoustic valve either sequentially toggles it's state, or it can be forced into a certain state by shortly interrupting the H-bridge PWM signal once (open) or twice (closed).

Figure 6:
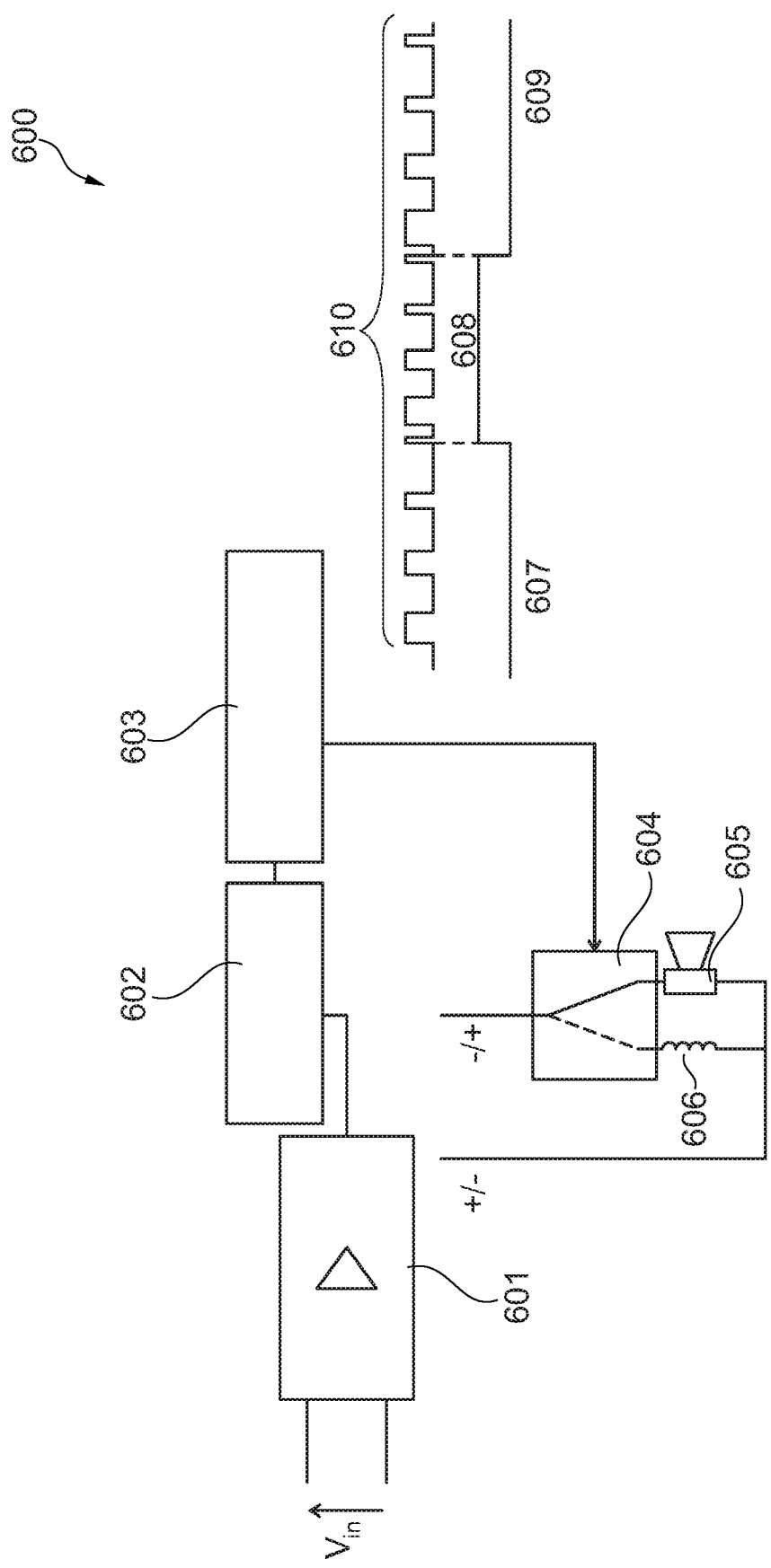
FIG. 6 shows an embodiment of the present invention using an embedded input signal.

In the embodiment shown in FIG. 6 the acoustic valve is controlled using an embedded signal in the signal, Vin, from the H-bridge. The signal from the H-bridge is provided via two wires and facilitates the following three functionalities: Driving the speaker 605, controlling the switch 604, and directly or indirectly powering the coil 606 of the acoustic valve via a local power source (not shown). The local power source may be a power harvesting unit in combination with a storage capacitor.

The high level block diagram shown in FIG. 6 comprises a detector unit 601 for detecting an embedded digital trigger signal from the H-bridge, and based on this detection activate a driver circuit to power the coil 606 of the acoustic valve. The embedded signal may include redundant clues to avoid erroneous switching.

An example of an embedded signal 608 in Vin is shown in FIG. 6. The sequence 610 of Vin shown in FIG. 6 comprises two portions 607, 609 intended for driving the speaker 605 and one portion 608 intended for controlling the acoustic valve. An embedded signal portion 608 is detected using the bit extraction unit 602 and the flag+message detection unit 603 which controls the switch 604. The switch 604 may include the above mentioned local power harvesting unit in combination with the storage capacitor.

In the embodiment shown in FIG. 6 the H-bridge signal Vin is monitored digitally which facilitates that the complexity of the detection circuitry may be significantly reduced. The actual switching may be done by either using a switch 604 to divert the H-bridge power to the coil 606 of the acoustic valve, or by utilizing locally harvested and stored energy to power the combined storage/switch 604.

Again, the embedded trigger signal in Vin may have different natures. In one embodiment the embedded trigger signal involves that a bit sequence of a length such that the chance of accidental trigger is small, e.g., smaller than 1 in 10e6.

Figure 7:
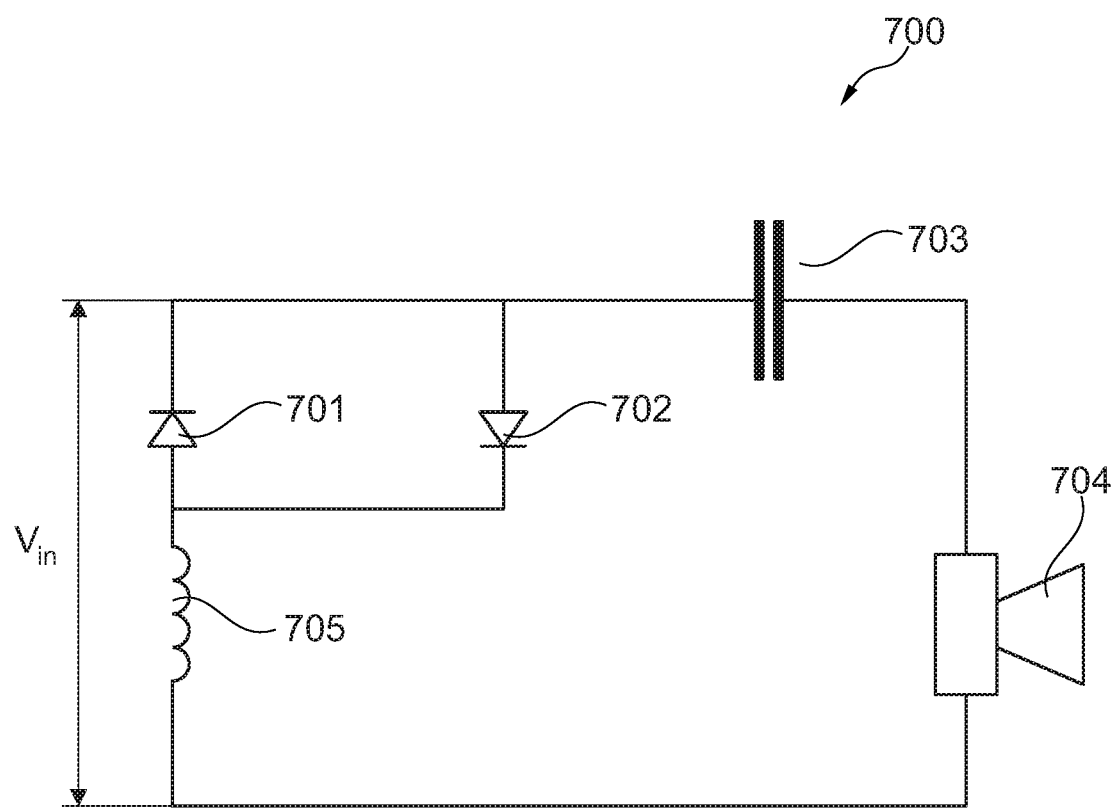
FIG. 7 shows an embodiment of the present invention using voltage control.

Referring now to FIG. 7 yet another embodiment of the present invention is depicted. The circuit topology of the embodiment shown in FIG. 7 is simple compared to the circuit topologies of the previous embodiments. Again, the signal from the H-bridge is provided via two wires and facilitates the following three functionalities: Driving the speaker 704 and directly powering the coil 705.

The diagram shown in FIG. 7 shows a voltage dependent conductor in the form of two anti-parallel diodes 701, 702 each having a certain forward threshold voltage Vf. When the voltage difference across these diodes is higher than Vf the diodes and thereby the voltage dependent conductor will start conducting. Similarly, when the voltage difference across these diodes is lower than Vf there will be no conduction. The capacitor 703 is provided in order to reduce the effects of DC currents floating through the speaker 704, while activating the acoustic valve.

According to this embodiment the input level of Vin determines whether the speaker 704 or the coil 705 of the acoustic valve is activated. If the voltage level from the H-bridge Vin stays below the threshold voltage Vf of the diodes 701, 702 the acoustic valve will not be activated, whereas the speaker will be operational. If the voltage level from the H-bridge Vin is increased above Vf one of the diodes 701, 702 (depending on the polarity of Vin) will conduct whereby a current is drawn through the coil 705 of the acoustic valve. For activation of the acoustic valve Vin should change from a typical Class D PWM signal to a short low frequency pulse with a defined polarity and sufficiently long duty cycle to activate the acoustic valve and define the state (open/closed) thereof. In an alternative embodiment the diodes 701, 702 may be replaced by an ASIC or circuit that uses multiple threshold levels allowing multiple switching states.

Figure 8A:
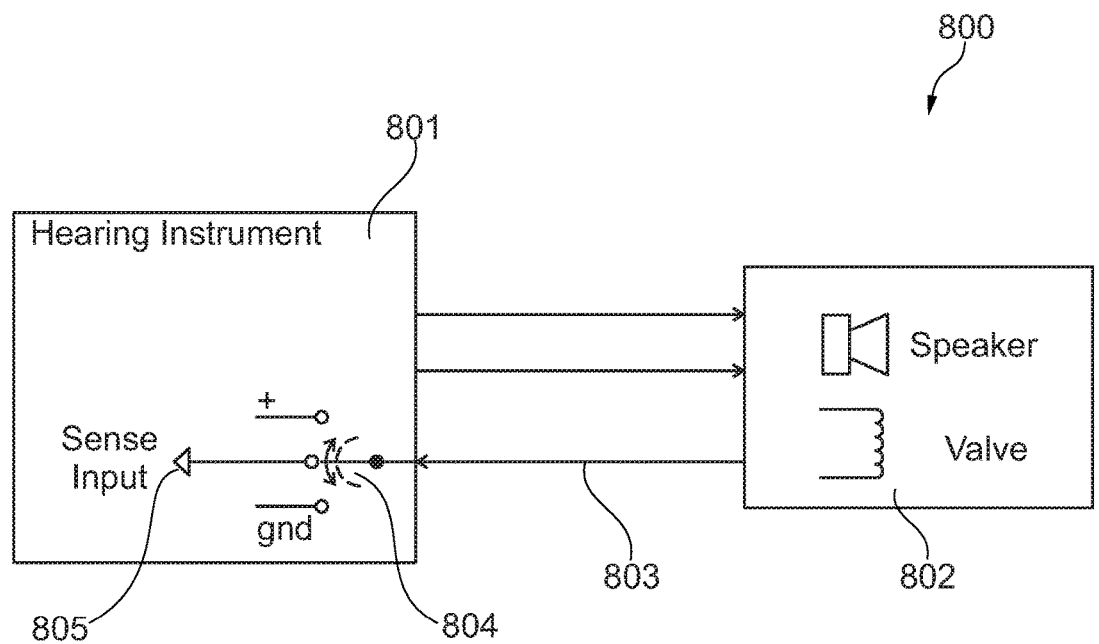
FIGS. 8a and 8b show status information arrangements for the acoustic valve.

FIG. 8*a* relates to an embodiment there an information signal 803 is provided from the in-ear piece 802 to the hearing instrument 801 of the hearing device 800. The information signal 803 may be used to provide information about the state of the valve, or it may be used to provide signals to the hearing instrument from other sensors (not shown) within the in-ear piece. Such other sensors may for example involve temperature, humidity, pressure and/or acoustical sensors.

In case of sensing the status of the acoustic valve, or feeding any other signal back to the hearing instrument from the in-ear piece can for example be implemented by using one of a maximum of three wires as illustrated in FIG. 8*a* where the switch 804 is positioned in a floating state. In this state the information signal from the in-ear piece is provided to an appropriate signal processor for further processing. The switch 804 may alternatively be positioned in a high state (+) within which state power may be supplied to the in-ear piece. Moreover, in a low state (gnd) current from the in-ear piece may be earthed.

Figure 8B:
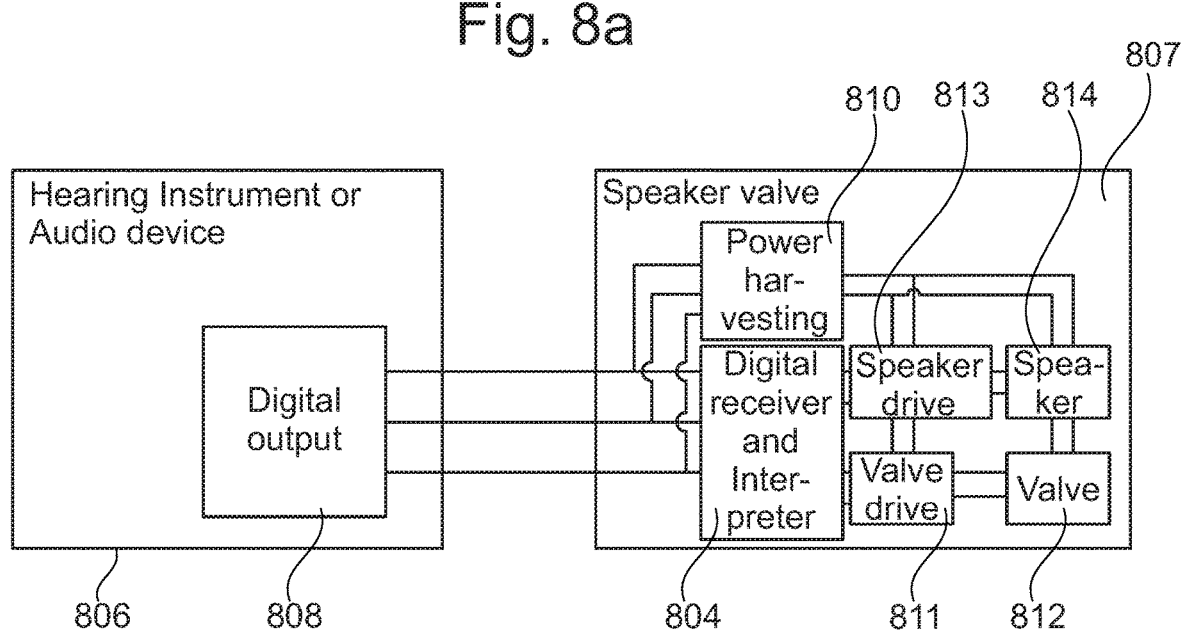

FIG. 8*b* shows a high level block diagram of the arrangement depicted in FIG. 8*a*. In FIG. 8*b* the hearing instrument 806 comprises, among other components, such as a processor, a digital output interface 808 which communicates with a digital receiver and interpreter unit 804 in the in-ear piece 807. Both the digital output interface 808 and the digital receiver and interpreter unit 804 are capable of both receiver and sending signal, including drive signals for the speaker 814 and/or control signals for the acoustic valve 812 as well as information/sensing signals, such as data signals, relating to for example the state of the acoustic valve 812. It should be noted that the information/sensing signals may provide information about/from any type of controllable non-speaker transducer. A power harvesting unit 810 generates and optionally stores power on the basis of incoming drive signals to the in-ear piece, i.e. received drive signals. The generated power is used for powering the speaker driver 813 and the valve driver 811 which drives/controls the speaker 814 and the acoustic valve 812, respectively.

FIGS. 9-12 show cross-sectional depictions of various detection arrangements for determining the status of an acoustic valve.

Figure 9A:
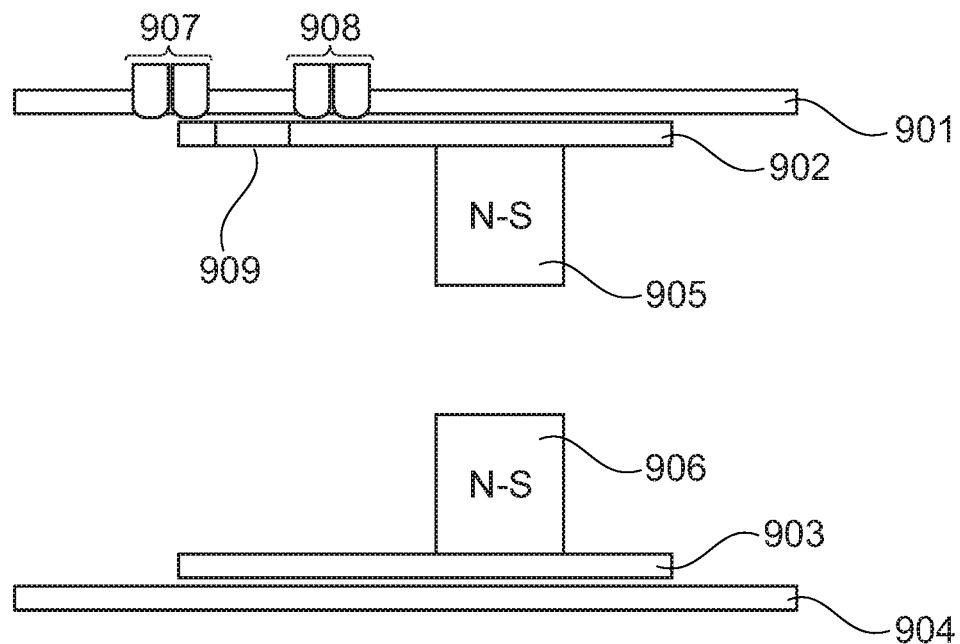
FIGS. 9a and 9b show first and second arrangements for status detection of the acoustic valve.

Referring now to FIG. 9*a* an arrangement utilizing electrical contacts 907, 908 and a contact pad 909 is depicted. In FIG. 9*a* the outer structures 901, 904 are stationary, whereas the inner structures 902, 903 and the magnets 905, 906 secured thereto are moveable. As seen in FIG. 9*a* a contact pad 909 is secured to the inner structure 902. When a drive current, typically in the form of a current pulse or burst, is applied to the drive coil (not shown) of the acoustic valve, the contact pad 909 is adapted move between the electrical contacts 907 and contacts 908. In case the contact pad 909 is aligned with the electrical contacts 907 these contacts are short-circuited and a current is allowed to flow through these contacts. Similarly, in case the contact pad 909 is aligned with the electrical contacts 908 a current is allowed to flow through these contacts due to short-circuiting thereof. Thus, by determining through which contacts (907 or 908) a current is allowed to flow the status, i.e. open or closed, of the acoustic valve may be determined.

Figure 9B:
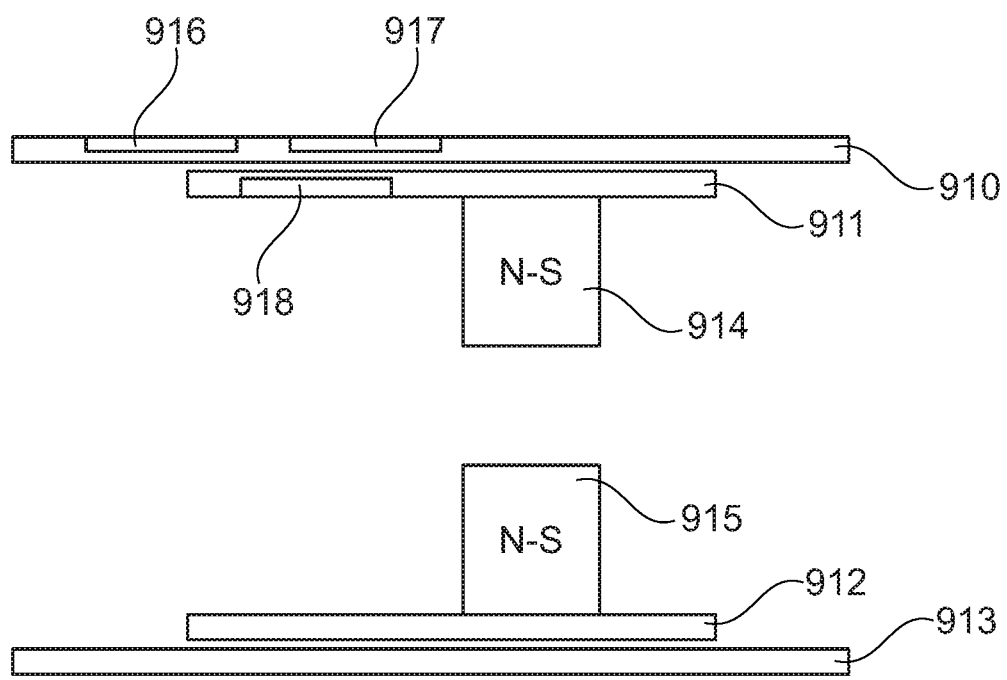

Referring now to FIG. 9*b* an arrangement utilizing a capacitive coupling between electrodes 916, 917 and charge carrier 918 is depicted. In FIG. 9*b* the outer structures 910, 913 are stationary, whereas the inner structures 911, 912 and the magnets 914, 915 secured thereto are moveable. As depicted in FIG. 9*b* the electrodes 916, 917 are secured to the outer structure 910, whereas the charge carrier 918 is secured to the inner structure 911. When a drive current, typically in the form of a current pulse or burst, is applied to the drive coil (not shown) of the acoustic valve, the charge carrier 918 is adapted move between the electrodes 916 and 917. In case the charge carrier 918 is aligned with the electrode 916 a measurable capacitive coupling therebetween is established. Similarly, in case the charge carrier 918 is aligned with the electrode 917 a measurable capacitive coupling therebetween is established. Thus, by determining to which electrode (916 or 917) a capacitive coupling is established the status, i.e. open or closed, of the acoustic valve may be determined.

Figure 10A:
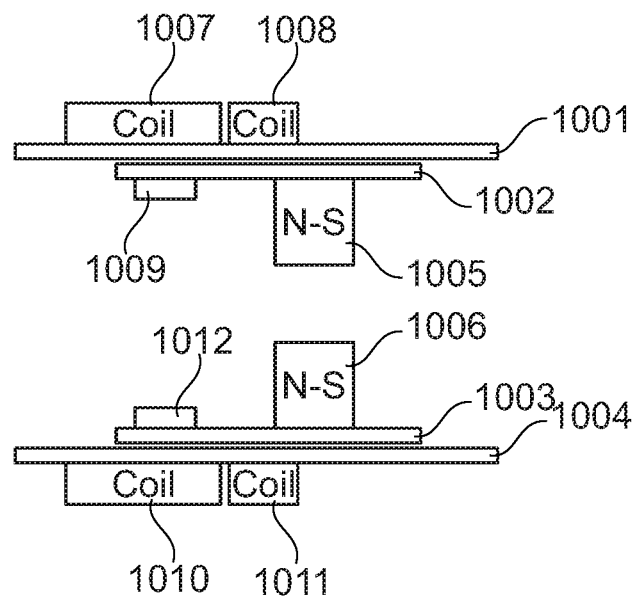
FIGS. 10a, 10b and 10c show third and fourth arrangements for status detection of the acoustic valve.

Referring now to FIG. 10*a* an arrangement utilizing an inductive coupling between coils 1007, 1008 and magnet 1009, and between coils 1010, 1011 and magnet 1012 is depicted.

In FIG. 10*a* the outer structures 1001, 1004 are stationary, whereas the inner structures 1002, 1003 and the magnets 1005, 1006 secured thereto are moveable. As depicted in FIG. 10*a* the coils 1007, 1008 are secured to the outer structure 1001, whereas the magnet 1009 is secured to the inner structure 1002. Similarly, the coils 1010, 1011 are secured to the outer structure 1004, whereas the magnet 1012 is secured to the inner structure 1003. When a drive current, typically in the form of a current pulse or burst, is applied to the drive coil (not shown) of the acoustic valve, the magnets 1009, 1012 are adapted to move between the coils 1007, 1008 and 1010, 1011, respectively. In case the magnet 1009 moves towards the coil 1007 (and magnet 1012 moves towards coil 1010) measurable induction changes of coils 1007, 1010 are established. Similarly, in case magnets 1009, 1012 move towards respective coils 1008, 1011 measurable induction changes of coils 1008, 1011 are established. Thus, by determining to which coils (1007, 1010 or 1008, 1011) induction changes are associated the status, i.e. open or closed, of the acoustic valve may be determined.

In case the magnets 1009 and 1012 are replaced by a metal with high magnetic permeability, their position can be derived from the impedance of coils 1007 and 1010 relative to 1008 and 1011.

Figure 10B:
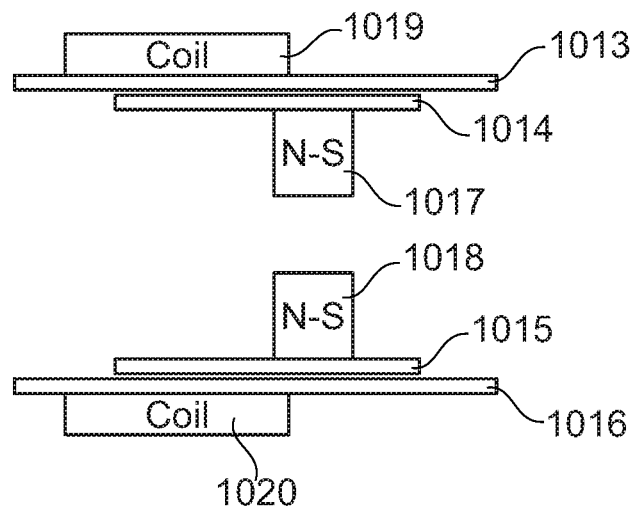

A simplified implementation of a magnetic coupling approach (back EMF) is depicted in FIG. 10*b*. Again, the outer structures 1013, 1016 are stationary, whereas the inner structures 1014, 1015 and the magnets 1017, 1018 secured thereto are moveable. When a drive current, typically in the form of a current pulse or burst, is applied to the drive coil (not shown) of the acoustic valve, the magnets 1017, 1018 are adapted to be either aligned or not aligned with the respective coils 1019, 1020. In case the magnets 1017, 1018 are aligned with respective coils 1019, 1020 a measurable back EMF is provided when the magnets 1017, 1018 are moved relative to the respective coils 1019, 1020. In the unaligned scenario essentially no back EMF is provided. Thus, by determining the presence of a current induced in the coils 1019, 1020 the status, i.e. open or closed, of the acoustic valve may be determined.

Figure 10C:
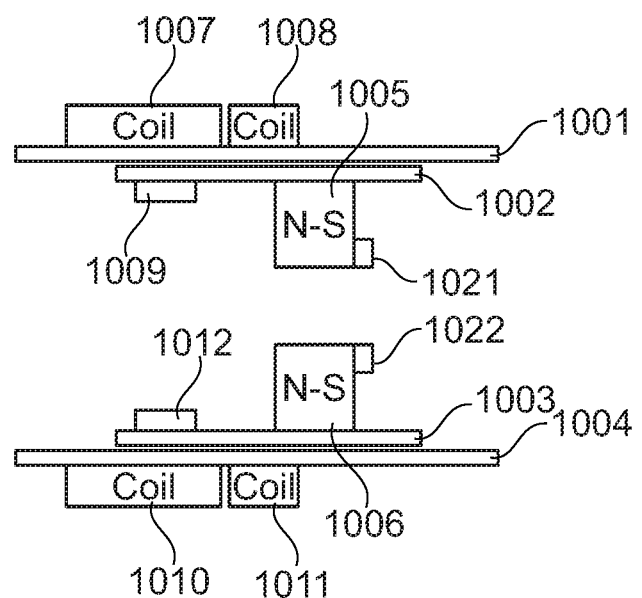

The arrangement depicted in FIG. 10c is similar to that shown in FIG. 10a with the exception that elements 1021, 1022 of a magnetic material have been added to the moveable structure in order to increase the sensitivity. The magnetic material may for example be a mu-metal in the form of a nickel-iron soft ferromagnetic allow having a very high permeability. The element 1021, 1022 are preferable positioned so that they do not affect the magnetic actuation. This may be achieved by positioning small rings on the magnets 1005, 1006 as depicted in FIG. 10c. In the implementation shown in FIG. 11a a Hall sensor 1107 is used for direct sensing of the position of the magnet 1105. Thus, by determining the position of the magnet 1105 (and magnet 1106) relative to the Hall sensor 1107 the position of the outer structures 1101, 1104 relative to the position of the inner structures 1102, 1103 can be determined. In this manner the status, i.e. open or closed, of the acoustic valve may be determined.

Figure 11A:
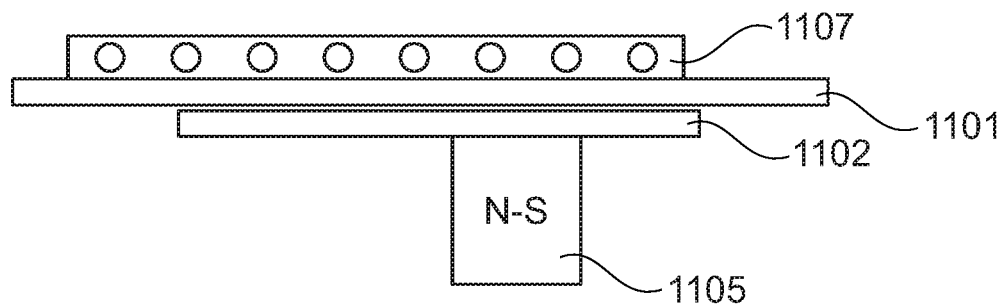
FIGS. 11a and 11b show fifth and sixth arrangements for status detection of the acoustic valve.
Figure 11A:
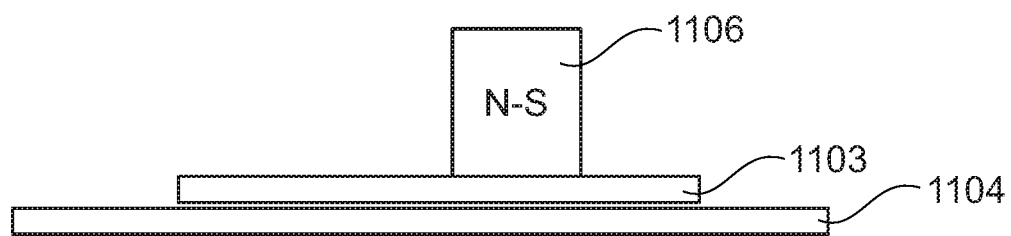
Figure 11B:
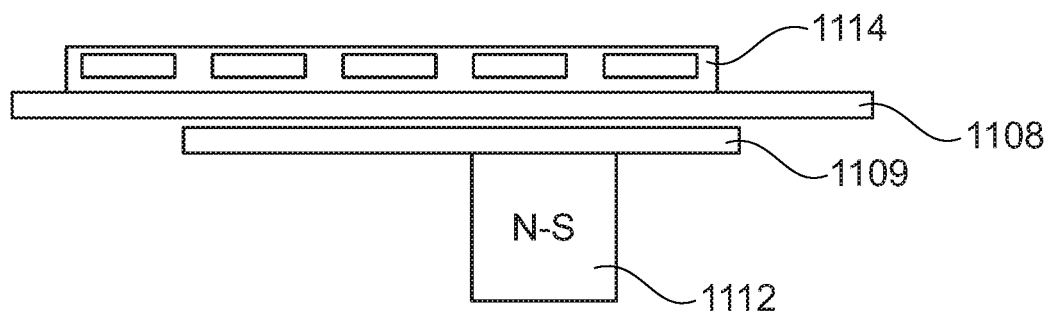
Figure 11B:
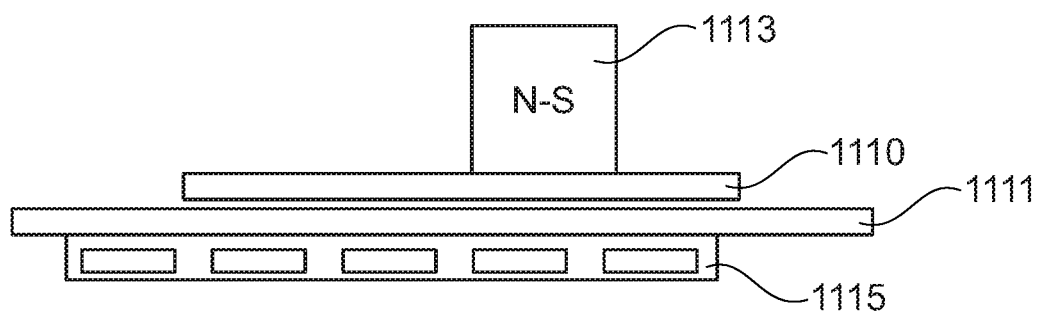
Figure 12:
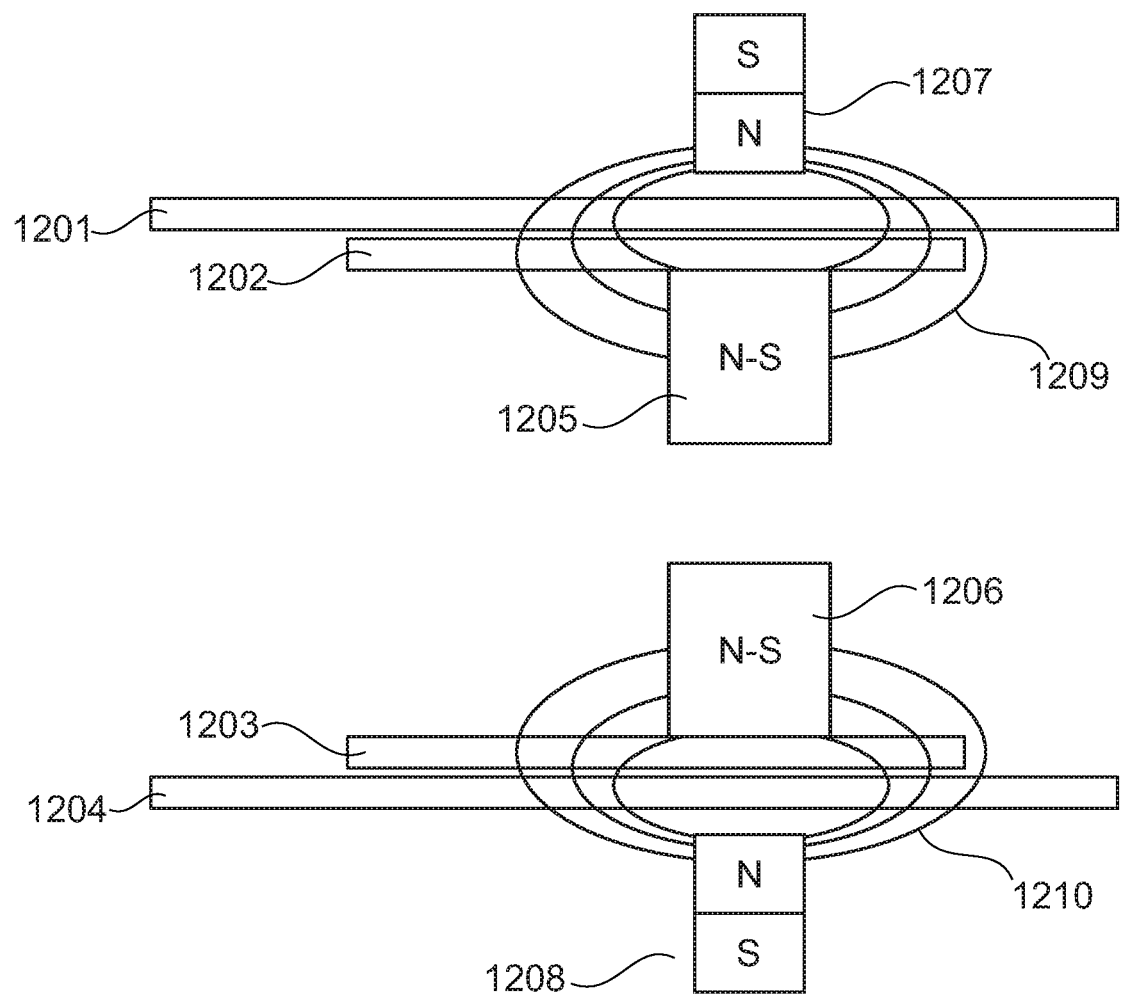
FIG. 12 shows a seventh arrangement for status detection of the acoustic valve.

In the implementation shown in FIG. 11b a light emitting array 1114 and a light detecting array 1115 is used for direct sensing of the position of the magnets 1112, 1113 via simple shadowing. Thus, by determining the position of the magnets 1112, 1113 the position of the outer structures 1108, 1111 relative to the position of the inner structures 1109, 1110 can be determined. In this manner the status, i.e. open or closed, of the acoustic valve may be determined.

In the implementation shown in FIG. 12a reed relays 1207, 1208 are applied for direct sensing of the position of the magnets 1205, 1206, respectively, via magnetic interactions 1209, 1210. Thus, by directly determining the position of the magnets 1205, 1206 relative to the reed relays 1207, 1208 the position of the outer structures 1201, 1204 relative to the position of the inner structures 1202, 1203 can be determined. In this manner the status, i.e. open or closed, of the acoustic valve may be determined.

Figure 13:
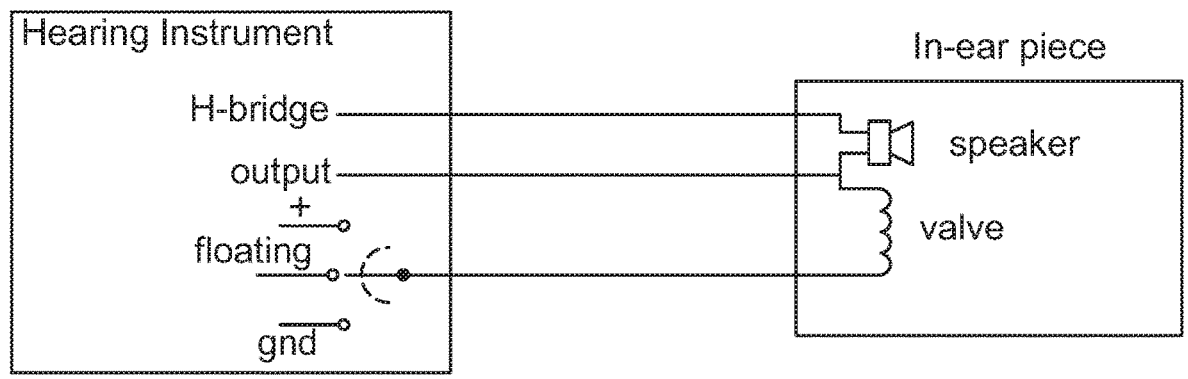
FIG. 13 shows a 3-wire actuation scheme.

With reference to FIG. 13 a 3-wire actuation scheme between a hearing instrument and an in-ear piece is depicted. As seen in FIG. 13 the speaker is connected to 2 wires of the H-bridge, and the coil of the acoustic valve is connected between one leg of the H-bridge and the 3rd connection. Activation of the acoustic valve now only depends on a proper combination of signals of the H-bridge and the 3rd connection:

1) The 3rd connection is floating: The acoustic valve never switches regardless of the signals on the H-bridge 2) The acoustic valve will be activated if the H-bridge is set to an extreme value for a sufficient long time period, and an opposite voltage is applied to the 3rd connection.

The terms "sufficiently long" can either be DC or a very low frequency signal that has a cycle time which is long enough to switch the acoustic valve. The speaker and/or the user is not hampered by this as it will not give output for low audio frequencies.

Figure 14:
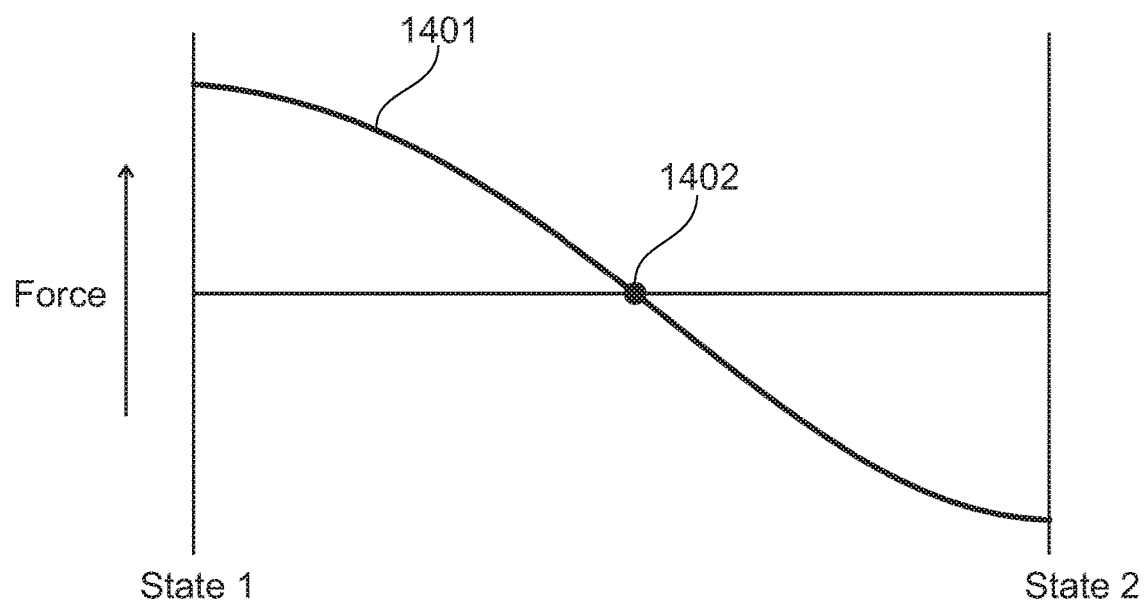
FIG. 14 illustrates the force between the two states.

Referring now to FIG. 14 the net retention force vs. displacement between two stable states (State 1 and State 2) is illustrated by curve 1401. As depicted in FIG. 14 the net retention force has its maxima values at the two stable states, whereas at the neutral point 1402 the net retention force equals zero as the retention forces from the two stable states ideally cancel each other. The neutral point 1402 is typically in the middle between the two stable states, State 1 and State 2. As it will be addressed in further details below the controllable acoustic valve comprises a moveable valve element which is adapted to move between the two stable states. Depending on the position of the moveable valve element the controllable acoustic valve will be either open or closed.

Figure 15:
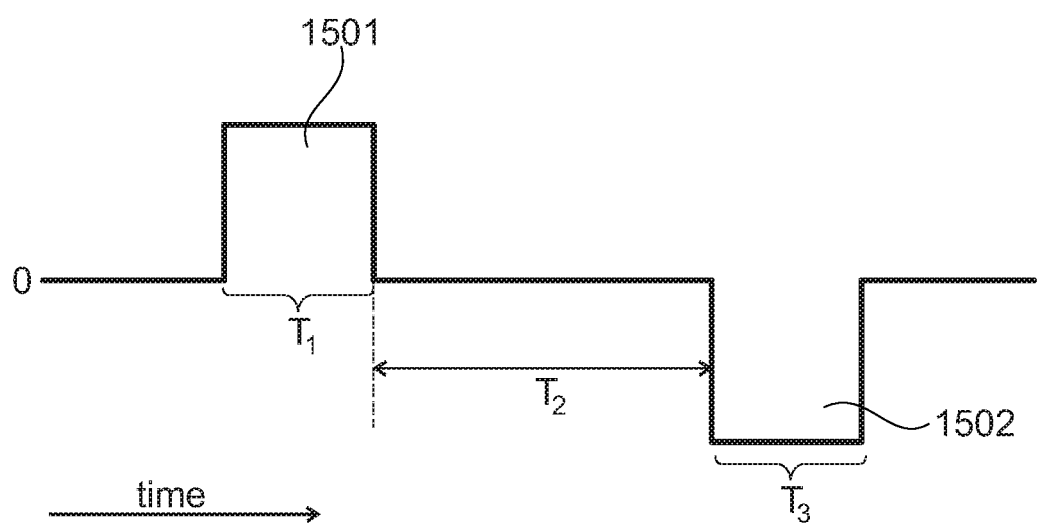
FIG. 15 shows an example of a drive signal.

Turning now to FIG. 15 a drive signal for controlling a controllable acoustic valve, and thereby the position of the moveable valve element, is depicted. The drive signal comprises a positive pulse 1501 for moving the moveable valve element in a first direction, and a negative pulse 1502 for moving the moveable valve element in a second and opposite direction. The first moving direction may be from an open state to a closed state, whereas the second moving direction may be from a closed state to an open state. The positive and negative pulses have respective durations of T1 and T3, and the distance between the pulses is T2. Typically the time durations T1 and T3 are the same, but they might be different. The energy of the positive and negative pulses should be sufficient to overcome the retention forces at the respective stable states and move the moveable valve element beyond the neutral point 1402, cf. FIG. 14.

Figure 16A:
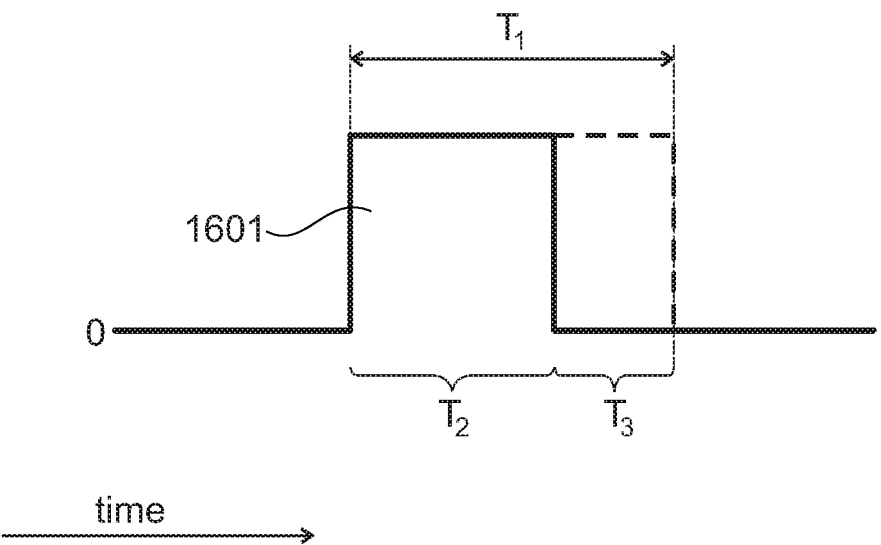
FIGS. 16a and 16b shows examples of a drive signal having a reduced pulse length.

FIG. 16a shows part of a drive signal comprising a shortened positive pulse 1601 having a duration of T2. The normal duration of the positive pulse 1601 is T1 as indicated by the dashed lines and as shown in FIG. 15. In FIG. 16a the positive pulse 1601 has be shortened by a time duration of T2 in order to apply only just enough energy to move the moveable valve element beyond the neutral point. Thus, the energy of the positive pulse 1601 is only slightly bigger compared to the energy required to move the moveable valve element away from a stable state (overcome the retention force) and beyond the neutral point. Slightly bigger should in the present context be understood as a few percentages, such as below 25%, such as below 20%, such as below 15%, such as below 10%, such as below 5%. Shortening the positive pulse 1601, and thereby reducing the energy of the pulse, is advantageous seen from an energy saving perspective.

Figure 16B:
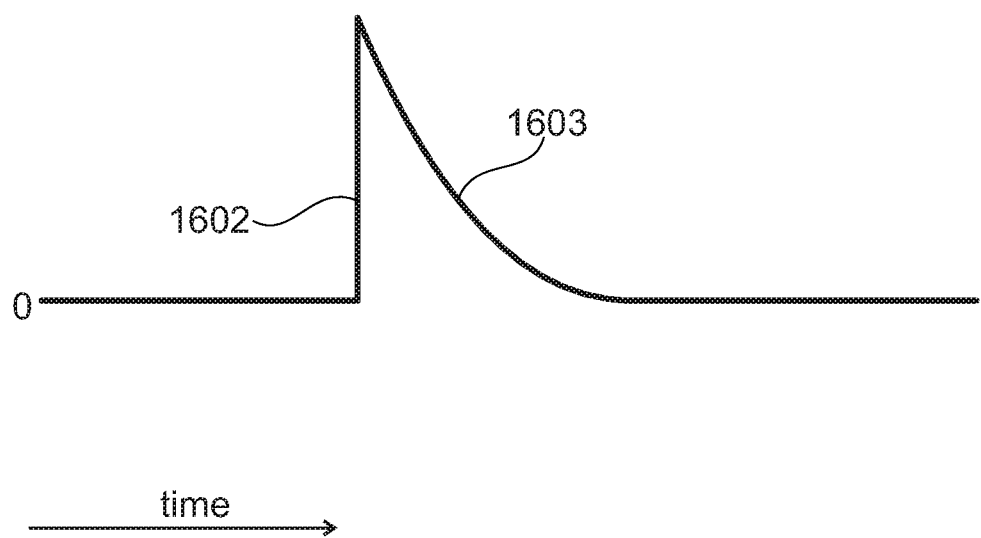

In an alternative energy saving approach the drive signal may comprise a positive pulse that originates from discharging a capacitor. This kind of pulse comprises a steep flange 1602 followed by a decay rate 1603 as depicted in FIG. 16b. Other possibilities could be to change the ramp-up and/or ramp-down of the applied pulse.

A controllable acoustic valve should be as quiet as possible in order not to disturb the overall sound picture of a sound generating receiver arranged in its vicinity. Thus, click and/or contact noises as well as other types of disturbing noises originating from the operation of the controllable acoustic valve should indeed be avoided or at least reduced.

Figure 17A:
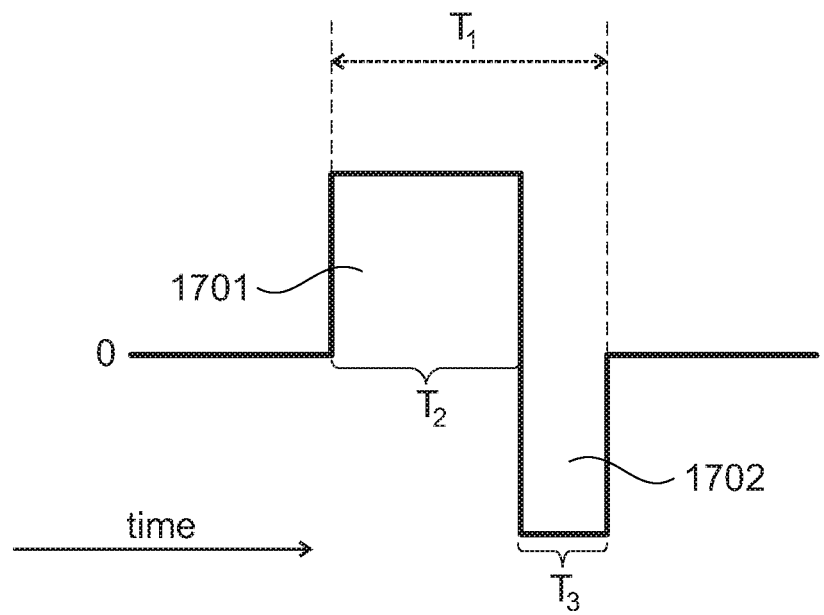
FIGS. 17a and 17b shows examples of drive signals adapted for soft landing.

Turning now to FIG. 17a part of a drive signal comprising a pulse having two portions 1701, 1702 is depicted. The total duration of the pulse is T1. Generally, the positive pulse 1701 having a duration of T2 is adapted to overcome the retention force and bring the moveable valve elements beyond the neutral point, whereas the negative pulse 1702 having a duration of T3 is adapted to slow down or deaccelerate the moveable valve element in order to secure a soft and noise free landing of the moveable valve element. The durations T2 and T3 are both variable in order to ensure optimal performance. Moreover, the amplitudes of the pulses 1701, 1702 are variable.

Figure 17B:
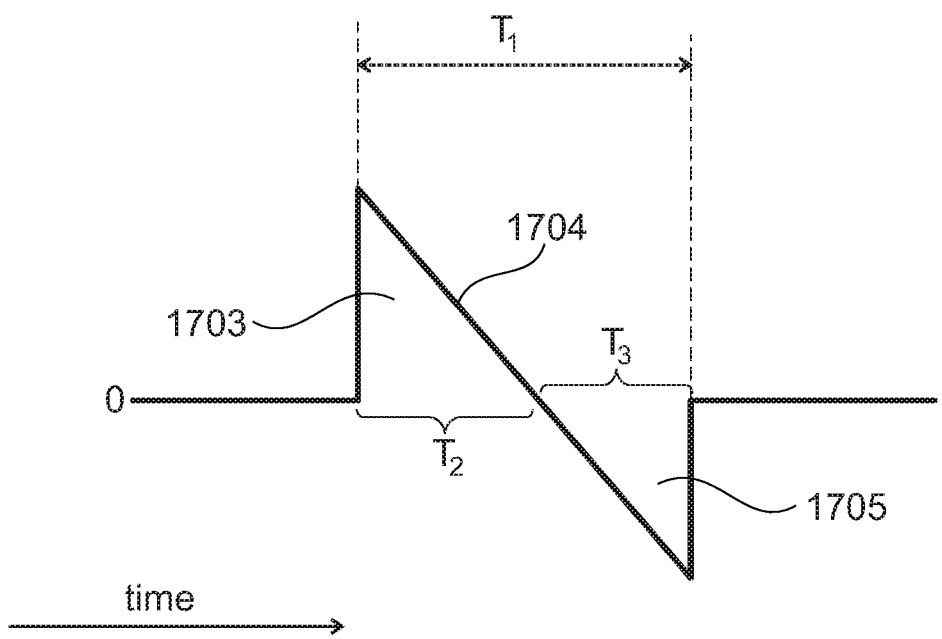

In FIG. 17b a drive signal comprising a sawtooth shaped pulse 1704 is depicted.

Similar to FIG. 17a the positive pulse 1703 having a duration of T2 is adapted to overcome the retention force and bring the moveable valve elements beyond the neutral point, whereas the negative pulse 1705 having a duration of T3 is adapted to slow down or deaccelerate the moveable valve element in order to secure a soft and noise free landing of the moveable valve element. The sum of T2 and T3, which both may be varied, equals T1. Moreover, the amplitudes of the pulses 1701, 1702 are variable. Other pulse shapes, such as for example sinusoidal shape, may also be applicable.

Figure 18:
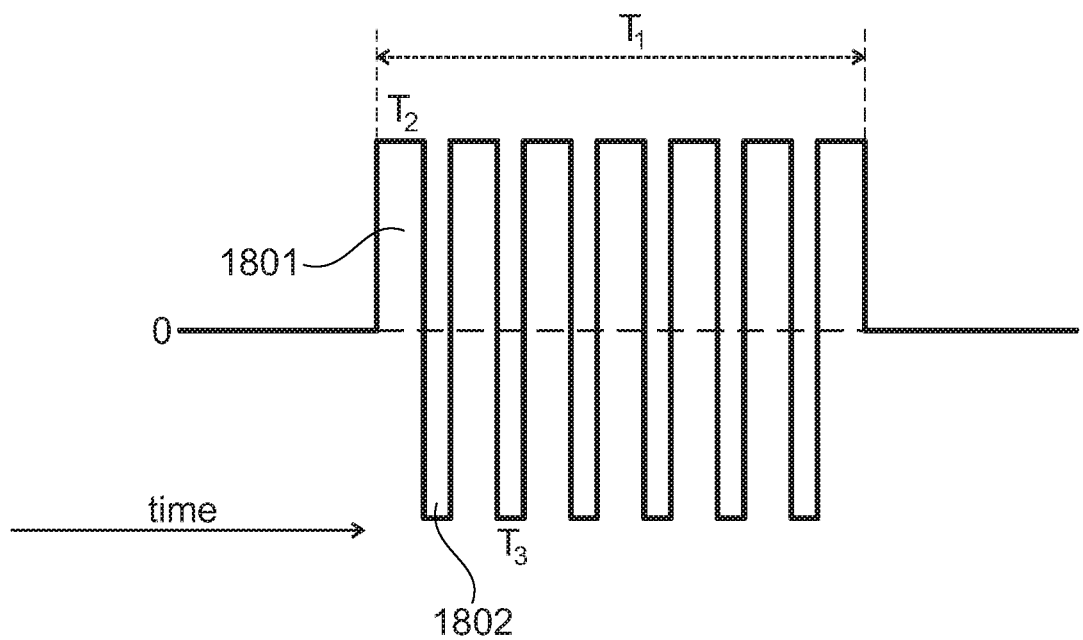
FIG. 18 shows a drive signal comprising a plurality of pulses.

As depicted in FIG. 18 a plurality of positive and negative pulses may be applied instead of a single pulse. The positive and negative pulses have a positive net power. A consequence of using a plurality of pulses is that the moveable valve element moves slower which results in less abrupt changes to the system and also a lower click and contact noise level.

The respective durations T2 and T3 of the positive 1801 and negative 180 pulses are both variable and may thus be changed. For example the ratio between T2 and T3 may be changed when the moveable valve element is beyond the neutral point. The total duration of the pulse is T1. The plurality of pulses may also be used for calibration purposes in that after each small pulse it may be sensed or verified whether the controllable acoustic valve is in an acoustically sufficient open or closed state, e.g. in a state passing or not passing predetermined frequencies. After a calibration sequence, the amount of required small pulses may be stored in a memory for future use for either opening or closing the controllable acoustic valve. Alternatively the small pulses may be added to generate a longer pulse.

Figure 19:
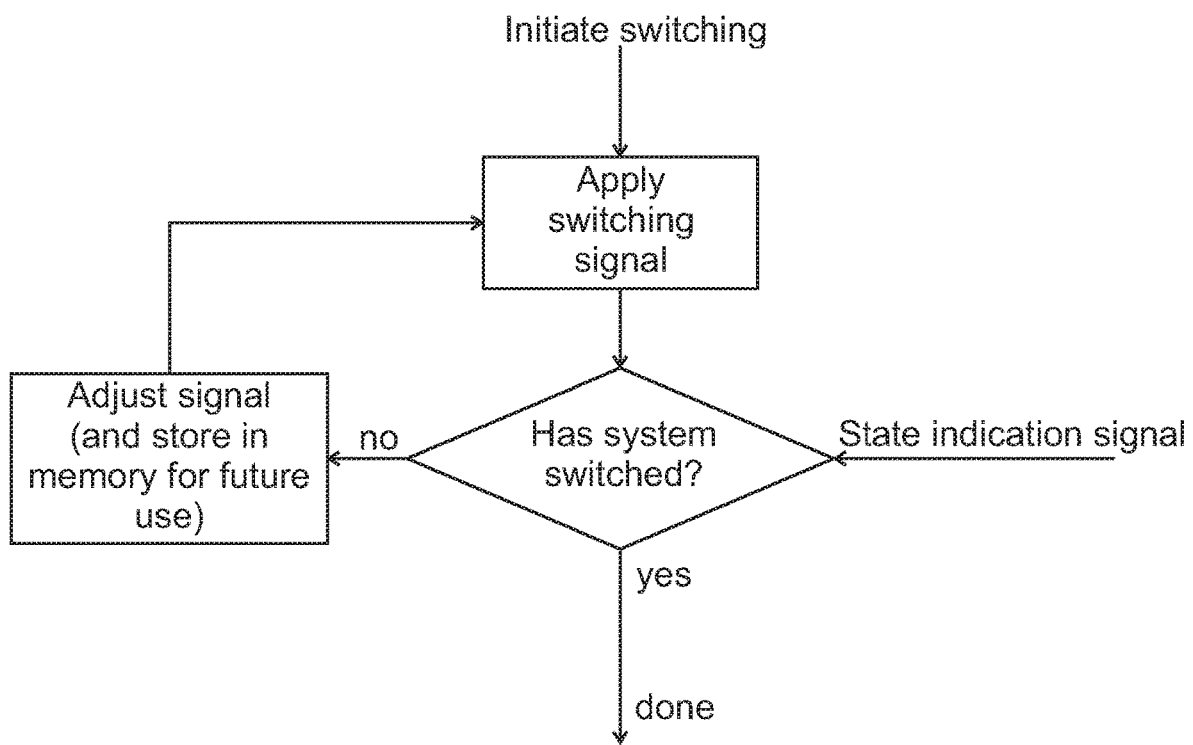
FIG. 19 shows a block diagram of a control scheme involving use of a state indication signal.

FIG. 19 shows a block diaphragm of an arrangement being capable of verifying a state of a controllable acoustic valve, i.e. verifying whether the controllable acoustic valve is in the expected state. As depicted in FIG. 19 a first drive/switching signal is initially applied to the controllable acoustic valve. A state indicating signal then provides information about which stable state the moveable valve element is in. In case the state indication signal reveals that the moveable valve element is in an undesired state a second and adjusted drive/switching signal is applied to the controllable acoustic valve. Typically the second drive/switching signal comprises more energy compared to the first drive/switching signal. This sequence is repeated until the moveable valve element is in the desired state. Values associated with one or more adjusted drive/switching signal may be stored for later use.

The invention claimed is:

1. A method for controlling a controllable acoustic valve of a hearing device, the controllable acoustic valve comprising a moveable valve element adapted to be positioned in one of at least two essentially stable states, wherein the moveable valve element is configured to be maintained in each of the essentially stable states by a retention force, the method comprising the step of providing a drive signal to the controllable acoustic valve, said drive signal comprising a first and a second part, wherein the drive signal, in the first part, is adapted to overcome a retention force of a first essentially stable state in order to initiate movement of the moveable valve element from the first essentially stable state to a second essentially stable state, and wherein the drive signal, in the second part, is adapted to decelerate the movement of the moveable valve element before it reaches the second essentially stable state in order to reduce generation of impact noise.

2. A method according to claim 1, wherein the drive signal, in the first part, has a first amplitude, and wherein the drive signal, in the second part, has a second amplitude, said second amplitude being smaller than the first amplitude.

3. A method according to claim 1, wherein the drive signal, in the first part, has a positive polarity, and wherein the drive signal, in the second part, has a negative polarity.

4. A method according to claim 1, wherein the drive signal comprises a sawtooth shaped having a first part and second part, and wherein the drive signal, during the first part, has a positive polarity, and wherein the drive signal, during the second part, has a negative polarity.

5. A method according to claim 1, wherein the duration of the first and second parts of the drive signal are variable in order to ensure optimal performance.

6. A method according to claim 1, wherein the duration of the first part of the drive signal is longer that the duration of the second part of the drive signal.

7. A method according to claim 2, wherein the first and second amplitudes are essential constant amplitudes.

8. A method according to claim 2, wherein the first and second amplitudes of the respective first and second parts of the drive signal are variable.

9. A method according to claim 1, wherein the drive signal comprises a sinusoidal shaped having a first part and a second part, and wherein the drive signal, during the first part, has a positive polarity, and wherein the drive signal, during the second part, has a negative polarity.

10. A method according to claim 1, wherein the drive signal, during the first and second parts, comprise a plurality of pulses in order to slow down the movement of the moveable valve element, the plurality of pulses each having a variable duration.

11. A method according to claim 10, wherein one or more of the plurality of pulses have a positive polarity, and wherein one or more of the plurality of pulses have a negative polarity.

12. A method according to claim 1, further comprising the step of generating and receiving a state indication signal comprising information about which essentially stable state the moveable valve element is in after providing a first drive signal to the controllable acoustic valve.

13. A method according to claim 12, further comprising the step of providing a second drive signal to the controllable acoustic valve in case the state indication signal reveals that the moveable valve element is in an undesired state.

14. A method according to claim 13, wherein the second drive signal comprises more energy compared to the first drive signal.

15. A method according to claim 1, wherein the drive signal, in the second part, causes the movement of the moveable valves element to decelerate before the moveable valve element reaches the second essentially stable state in order to reduce generation of impact noise.

\* \* \* \* \*